(12) United States Patent
Maslakow

(10) Patent No.: US 9,394,052 B2
(45) Date of Patent: Jul. 19, 2016

(54) TRAY TABLE AND METHOD OF MANUFACTURE

(71) Applicant: Reliant Worldwide Plastics, LLC, Plano, TX (US)

(72) Inventor: William H. Maslakow, Lewisville, TX (US)

(73) Assignee: Reliant Worldwide Plastics, LLC, Plano, TX (US)

( * ) Notice: Subject to any disclaimer, the term of this patent is extended or adjusted under 35 U.S.C. 154(b) by 0 days.

(21) Appl. No.: 14/482,623

(22) Filed: Sep. 10, 2014

(65) Prior Publication Data

US 2015/0068435 A1  Mar. 12, 2015

Related U.S. Application Data

(60) Provisional application No. 62/030,721, filed on Jul. 30, 2014, provisional application No. 61/875,950, filed on Sep. 10, 2013.

(51) Int. Cl.
*B64D 11/06* (2006.01)
*B29D 24/00* (2006.01)
(Continued)

(52) U.S. Cl.
CPC .......... *B64D 11/0638* (2014.12); *B29D 24/002* (2013.01); *B29K 2101/12* (2013.01); *B29K 2105/0809* (2013.01); *B29L 2024/00* (2013.01); *Y02T 50/46* (2013.01); *Y10T 428/239* (2015.01)

(58) Field of Classification Search
CPC .......... A47B 23/001; A47B 5/02; A47B 5/04; A47B 23/04; B29C 45/16

USPC ........................................... 108/42, 44, 50.11
See application file for complete search history.

(56) References Cited

U.S. PATENT DOCUMENTS 2,064,435 A    12/1936  Loeffler
3,323,656 A *  6/1967  Weiss et al. ................... 211/153
(Continued)

FOREIGN PATENT DOCUMENTS

CA    2258068 A1    7/1999
CA    2569596 A1    12/2005
(Continued)

OTHER PUBLICATIONS

U.S. Appl. No. 14/048,840, Maslakow et al.
(Continued)

*Primary Examiner* — Daniel Rohrhoff
(74) *Attorney, Agent, or Firm* — Winstead PC

(57) ABSTRACT

Disclosed embodiments relate to trays typically comprising a composite internal structure, a thermoplastic frame typically located about the composite internal structure, and two cover sheets forming the upper and lower tray surfaces. The composite internal structure may be a corrugated composite structure in some embodiments. In other embodiments, the composite internal structure may comprise a series of composite elements (which might act a beams or struts). The cover sheets may comprise thermoplastic material, and in some embodiments, the cover sheets may comprise composite material (for example the same as for the corrugated composite structure). In some exemplary embodiments, the thermoplastic frame and the composite internal structure may have the same thermoplastic material, and they may be joined together to have a plurality of homogeneous connective attachments.

18 Claims, 18 Drawing Sheets

(51) Int. Cl.
 *B29L 24/00* (2006.01)
 *B29K 101/12* (2006.01)
 *B29K 105/08* (2006.01)

(56) References Cited

U.S. PATENT DOCUMENTS

| | | | |
|---|---|---|---|
| 4,159,071 A * | 6/1979 | Roca | 297/163 |
| 4,405,669 A | 9/1983 | Pott | |
| 5,141,816 A | 8/1992 | Walker et al. | |
| 5,233,743 A | 8/1993 | Robertson et al. | |
| 5,551,755 A | 9/1996 | Lindberg | |
| 5,769,496 A | 6/1998 | Gryp | |
| 5,871,207 A * | 2/1999 | Yoshida | 267/136 |
| 6,966,533 B1 | 11/2005 | Kalis et al. | |
| 7,357,443 B2 | 4/2008 | Wolff et al. | |
| 7,926,879 B2 | 4/2011 | Schmitz et al. | |
| 8,132,861 B2 | 3/2012 | Cone | |
| 8,505,997 B2 | 8/2013 | Hipshier et al. | |
| 8,596,206 B2 * | 12/2013 | Legeay | 108/50.11 |
| 2002/0074688 A1 * | 6/2002 | Smith et al. | 264/247 |
| 2004/0007791 A1 | 1/2004 | Lenferink et al. | |
| 2004/0118853 A1 | 6/2004 | Schaal et al. | |
| 2005/0140157 A1 | 6/2005 | Emerling | |
| 2005/0201080 A1 | 9/2005 | Seward | |
| 2007/0101671 A1 * | 5/2007 | Deeks | 52/578 |
| 2007/0262632 A1 | 11/2007 | Cody et al. | |
| 2008/0023600 A1 | 1/2008 | Perlman | |
| 2008/0136230 A1 | 6/2008 | Ling | |
| 2008/0277987 A1 | 11/2008 | Deadrick | |
| 2009/0174234 A1 * | 7/2009 | Vignal et al. | 297/163 |
| 2009/0196597 A1 | 8/2009 | Messinger et al. | |
| 2011/0127812 A1 | 6/2011 | DeVoe | |
| 2011/0155854 A1 * | 6/2011 | Bakker et al. | 244/132 |
| 2011/0204683 A1 * | 8/2011 | Roy et al. | 297/163 |
| 2011/0278885 A1 | 11/2011 | Procter et al. | |
| 2011/0316320 A1 | 12/2011 | Kulkarni et al. | |
| 2012/0181839 A1 | 7/2012 | Michalak et al. | |
| 2012/0306241 A1 * | 12/2012 | Winter et al. | 297/163 |
| 2012/0325123 A1 * | 12/2012 | Schoerkhuber et al. | 108/44 |
| 2013/0011623 A1 | 1/2013 | Jones et al. | |
| 2013/0082156 A1 | 4/2013 | Conner | |
| 2013/0119727 A1 | 5/2013 | Lavelle et al. | |
| 2013/0122246 A1 | 5/2013 | Berger et al. | |
| 2013/0320742 A1 | 12/2013 | Murolo et al. | |
| 2014/0077531 A1 | 3/2014 | Preisler et al. | |
| 2014/0183238 A1 | 7/2014 | Lin | |
| 2014/0198473 A1 | 7/2014 | Shah et al. | |
| 2014/0261097 A1 * | 9/2014 | Eilers et al. | 108/44 |
| 2015/0197075 A1 * | 7/2015 | Yizze et al. | 108/44 |
| 2015/0314501 A1 | 11/2015 | Maslakow | |
| 2015/0336495 A1 | 11/2015 | Maslakow | |
| 2015/0360784 A1 | 12/2015 | Maslakow | |

FOREIGN PATENT DOCUMENTS

| | | |
|---|---|---|
| CA | 2641166 A1 | 4/2010 |
| CH | 362224 A | 5/1962 |
| DE | 102008057220 B4 | 8/2013 |
| EP | 0030522 A2 | 6/1981 |
| EP | 0030522 A2 * | 6/1981 |
| EP | 0048055 A2 | 3/1982 |
| EP | 0492129 A1 | 7/1992 |
| EP | 0928804 A1 | 7/1999 |
| EP | 1424424 A1 | 6/2004 |
| EP | 1685009 A1 | 8/2006 |
| EP | 1820394 A1 | 8/2007 |
| EP | 2338768 A1 | 6/2011 |
| EP | 2608493 A1 | 6/2013 |
| EP | 2660048 A1 | 11/2013 |
| JP | S5642950 A | 4/1981 |
| JP | H06170889 A | 6/1994 |
| WO | WO-01072861 A2 | 10/2001 |
| WO | WO-2005049391 A1 | 6/2005 |
| WO | WO-2008/065446 A1 | 6/2008 |
| WO | WO-2009053573 A2 | 4/2009 |
| WO | WO-2009/156754 A1 | 12/2009 |
| WO | WO-2011120717 A1 | 10/2011 |
| WO | WO-2013021485 A1 | 2/2013 |
| WO | WO-2013036848 A1 | 3/2013 |
| WO | WO-2013144351 A1 | 10/2013 |
| WO | WO-2013187767 A1 | 12/2013 |
| WO | WO-2013187768 A1 | 12/2013 |
| WO | WO-2014058884 A1 | 4/2014 |
| WO | WO-2015038630 A1 | 3/2015 |

OTHER PUBLICATIONS

Copenheaver, Blaine R.; "International Search Report" prepared for PCT/US2014/054968 as mailed Dec. 19, 2014, 2 pages.

Mans, Peter; "International Search Report" prepared for PCT/US2013/063887 as mailed Dec. 20, 2013; 4 pages.

Mans, Peter; "Written Opinion of the International Searching Authority" for International Application No. PCT/US2013/063887 as mailed Dec. 20, 2013; 10 pages.

Accessory Power; "TabGRAB Tablet Car Headrest Mount Holder with Reindorced No-Slip Display Design for Samsung Galaxy Tab 3 10.1/Acer Iconia ASUS MeMO Pad FHD 10, VivoTab RT & More 10-inch Tablets"; http://www.amazon.com/gp/product/B005ISU7ZW?ie=UTF8&ref_=de_a_smtd&showDetailTech Data=1#technical-data; Nov. 2, 2011; 6 pages.

* cited by examiner

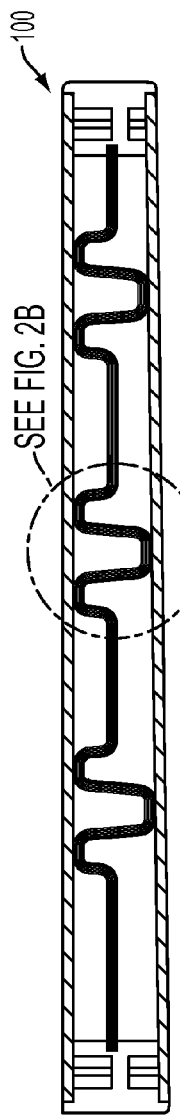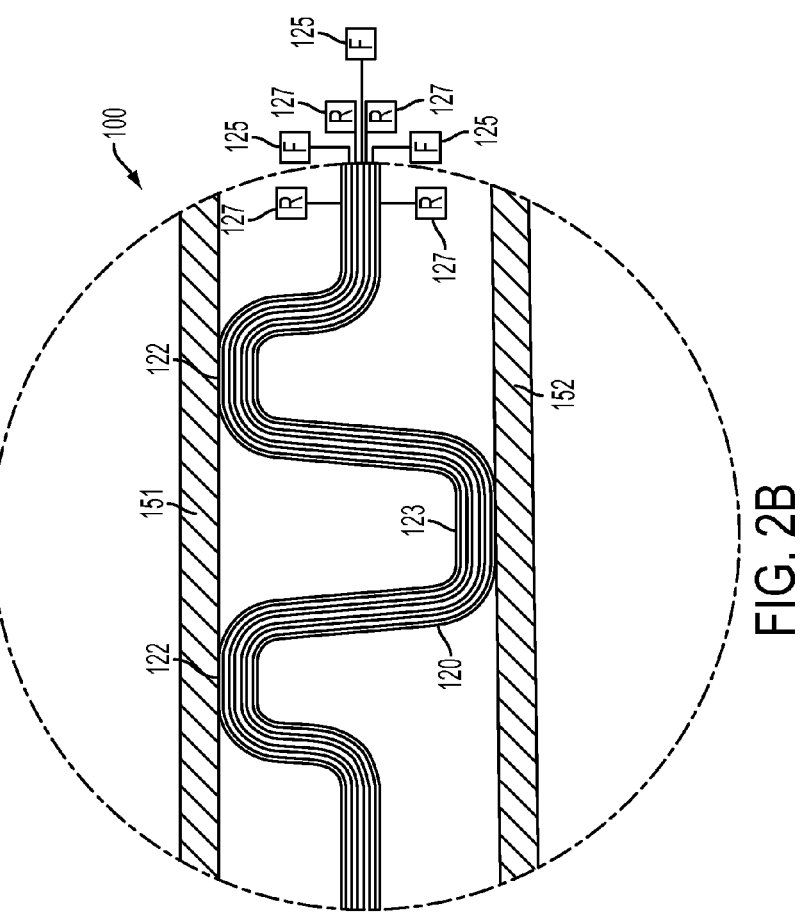

TRAY TABLE AND METHOD OF MANUFACTURE

CROSS-REFERENCE TO RELATED APPLICATIONS

This application claims priority to, and incorporates by reference the entire disclosure of, U.S. Provisional Patent Application No. 62/030,721, filed on Jul. 30, 2014 and U.S. Provisional Patent Application No. 61/875,950, filed on Sep. 10, 2013.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the commercial aircraft industry, weight and safety comprise important design aspects. Even non-structural and non-critical elements like a tray table on commercial aircraft are preferably designed with these aspects in mind. A weight savings on each tray table can add up to significant weight savings for the aircraft as a whole due to the large number of tray tables. Such a weight savings in turn reduces fuel expenditure and thereby provides a cost savings. Even in the case of tray tables, any such weight reduction must not adversely affect the strength necessary for a particular application. Typically, governmental rules and regulations specify strength requirements for aircraft elements, and at the very least strength issues may impact durability and expected lifespan of the element, such as a tray table. Of course, cost is also a driving factor in the commercial airline industry, so low cost manufacturing techniques may be important as well. Additionally, Applicant has noted that replacement of existing aircraft tray tables (for example, if the table malfunctions) may be an issue, requiring a significant amount of time to remove the tray table for replacement. Disclosed embodiments relate to improved tray table embodiments that may address one or more of these issues.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A is a cross-sectional view, taken about line A-A of the tray table of FIG. 1 above, showing the corrugated composite structure, the thermoplastic frame structure about the perimeter (exterior) side edges of the corrugated composite structure, and the upper and lower cover sheets forming the upper and lower surfaces of the tray table;

FIG. 2B is a magnified section of the tray table of FIG. 2A illustrating that the corrugated composite material and upper and lower cover sheets of this embodiment are comprised of composite material with an array of reinforcement fibers located within an encasing sheath of thermoplastic;

DETAILED DESCRIPTION

Figure 1:
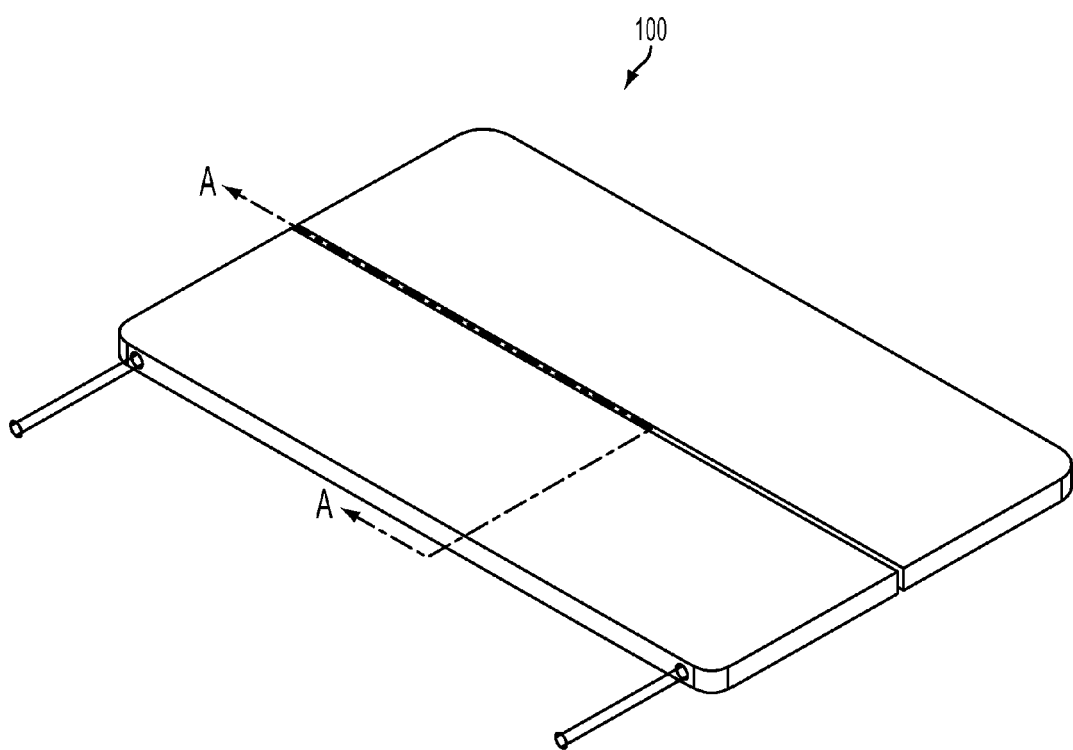
FIG. 1 is a perspective view of an exemplary tray table embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed embodiments generally may relate to an extension of concepts of embodiments previously disclosed in related provisional U.S. patent application 61/711,567 and related U.S. nonprovisional application Ser. No. 14/048,840, entitled Thermoplastic Injection Molded Element with Integral Thermoplastic Positioning System for Reinforced Composite Structures, filed respectively on Oct. 9, 2012 and Oct. 8, 2013, which is co-owned and hereby incorporated by reference to the extent it does not contradict the express disclosure herein. More specifically, disclosed embodiments may relate to tray table embodiments formed using composite materials and/or thermoplastic molded (for example, injection molded) materials.

Disclosed embodiments relate to a thermoplastic tray assembly for use in the commercial aerospace industry, which tray assembly may comprise an integral formed thermoplastic encapsulated carbon or glass reinforced composite element integrated into an injection molding thermoplastic frame structure.

Said tray may be further comprised of formed thermoplastic upper and lower covers affixed to thermoplastic frame structure by thermal or adhesive means.

Said injection molded thermoplastic frame structure may be configured to accept at least one snap-fit installed linear bearing support component.

Said linear bearing support may be removable from the thermoplastic tray table assembly by extraction tool actuation of integral snap-fit members on the linear bearing support component.

Said linear bearing support component may be produced with integral lubricated thermoplastic to provide reduced friction operation.

Said thermoplastic tray table assembly typically complies to FAR 25.853 and OSU55/55, with integral formed thermoplastic encapsulated carbon or glass reinforced composite element integrated into an injection molded thermoplastic frame structure with means to accept detachable snap-fit linear bearing components that provide reduced friction operation, and thermoplastic upper and lower covers affixed to the thermoplastic frame structure, provides a means to rapidly remove and replace said tray table assembly in a commercial passenger airplane.

Disclosed embodiments typically comprise chemical and molecular compatible thermoplastics resins throughout the assembly, creating a potentially infinite number of homogenous connective attachments that provide additional consistent strength, dimensional stability and rigidity.

Disclosed embodiments will typically meet FAR 25.853 and OSU55/55 throughout the tray table assembly.

Disclosed embodiments may provide increased mechanical load bearing capabilities provided by the integral formed thermoplastic carbon or glass reinforced composite element integrated into the injection molded thermoplastic frame structure.

The integral formed thermoplastic encapsulated carbon or glass reinforced composite element may comprise multiple weave patterns, multiple layers and/or layer orientations to provide the optimum performance for the requirement load application. For example, a five harness satin weave may be used for the carbon or glass reinforcement (typically fibers) in the composite of some embodiments.

Disclosed embodiments may provide a means to detach the tray table assembly from a passenger seat by way of extraction tool actuation of integral snap-fit features integral to the injection molded linear bearing components, without passenger seat disassembly.

Disclosed embodiments may provide a means to re-install a tray table assembly to a passenger seat by way of the integral snap-fit configuration saving service time and labor costs.

Disclosed embodiments will typically reduce the current weight of a comparable tray table assembly by the use of high strength to weight ratio thermoplastic materials and composites.

Disclosed embodiments may reduce manufacturing costs when compared to a thermoformed tray table assembly with integral aluminum support structure and integral injection foam support materials.

Disclosed embodiments may eliminate the scrap rejections inherent to the current injection foam process.

In an additional embodiment, said thermoplastic tray assembly may be further comprised of at least one integral formed thermoplastic encapsulated carbon or glass reinforced composite element, which would comprise one planar first surface, or side, an opposing parallel second surface, or side, of equal geometry, a third surface, or edge, perpendicular and positioned between said first and second surfaces, and a fourth surface, or edge, parallel and opposed to the third surface having equal geometry of said third surface.

Said composite element may be positioned in a vertical manner, with said third surface parallel to the bottom of the tray table frame.

Said thermoplastic composite element may further comprise thermally formed and consolidated thermoplastic encapsulated unidirectional or weave carbon or glass reinforcing fiber composite configured to meet the minimum load requirement of the tray table assembly.

Said tray table assembly may be further comprised of a thermoplastic injection molded carbon or glass chopped fiber reinforced support frame assembly which frame assembly may be injection molded and homogenously attached to the thermoplastic encapsulated unidirectional or weave carbon or glass reinforced composite element creating a thermoplastic composite frame assembly.

Said composite frame assembly may further be comprised of application specific support rib structures, mounting features and threaded insert mounting bosses that are homogenously attached to at least a portion of the composite elements.

Said frame assembly may further comprise a plurality of apertures provided through at least one wall section of the thermoplastic composite element. Said apertures may provide a pathway for the thermoplastic carbon or glass chopped reinforced material to flow through and about the composite element during the injection molding process to create the frame assembly.

Said tray table assembly may further comprise formed thermoplastic upper and lower covers affixed to thermoplastic frame structure by thermal or adhesive means.

Said injection molded thermoplastic frame structure may be configured to accept at least one snap-fit installed linear bearing support component.

Said linear bearing support is typically removable from the thermoplastic tray table assembly by extraction tool actuation of integral snap-fit members on the linear bearing support component.

Said linear bearing support component may be produced with integral lubricated thermoplastic to provide reduced friction operation.

Tray embodiments generally comprise one or more structural spacing elements, for example, serving as internal structural support for the tray, a thermoplastic frame encompassing, for example, about the perimeter of, the one or more structural spacing elements, for example, and typically defining the side edge perimeter of the tray, and two cover sheets, for example, an upper cover sheet and a lower cover sheet. The one or more structural spacing elements typically each comprise an upper surface support feature and a lower surface support feature, thereby defining the thickness of the tray and providing support for the top and bottom cover sheets, which top and bottom cover sheets form the upper and lower surface of the tray. The one or more structural spacing elements, thermoplastic frame, and cover sheets would be joined together to form the tray. In some embodiments, the structural spacing elements might comprise composite material. Additionally, in some embodiments having a plurality of structural spacing elements, the plurality of structural spacing elements might be linked together. In other embodiments, the structural spacing elements might not be linked, but instead be separate elements separated by open gaps or spaces. For example, in some embodiments, the one or more structural spacing elements might be one or more corrugations on a sheet of composite material, forming a corrugated composite structure which typically has a plurality of peaks and valleys defining the upper and lower surfaces of the tray. Specific embodiments related to the figures will be discussed in more detail below.

For example, composite material typically may comprise an array of reinforcing fibers such as, for example, carbon, graphite, glass, and aramid. Typically, in the case of carbon fibers, the carbon microscopic crystals are aligned parallel to the longitudinal axis of the carbon fibers. In all embodiments, the reinforcing fibers are aligned in a precise orientation, and a thermoplastic material such as, for example, a sheathing is located about and encapsulates the array of reinforcing fibers. The array of fibers may be a weave pattern such as, for example, a five harness satin weave, in some embodiments, while in other embodiments the array of fibers may be aligned uni-directionally in a parallel linear pattern. The composite material typically might be provided in pre-defined and/or pre-formed solid three dimensional geometries, such as a sheet, which can then be shaped according to the needs of the specific element, for example, by heat forming and/or cutting. Typically, the entire array of fibers of the composite material is located near the center (thickness) of the composite sheet material (e.g. in a central plane), with thermoplastic material located atop and beneath the array of fibers. In some alternative embodiments, the composite material might initially be a blank formed of thermoplastic resin with reinforcing fibers dispersed throughout (for example, approximately uniformly). Such an alternative composite might, for example, be injection molded into a blank form such as, for example, a sheet, using resin impregnated with reinforcing fibers. Regardless, the composite typically might provide approximately consistent fiber distribution and, in some embodiments, throughout the element, so that it can provide precise and consistent and reproducible structural and mechanical support.

In other embodiments, the composite material might be formed by layering thermoplastic film and reinforcing fiber cloth or weave, which would then be consolidated via, for example, heat and/or compression, into a unitary composite material with reinforcing fibers located between two thermoplastic layers. For example, each composite material layer might comprise two thermoplastic film layers sandwiching or surrounding a layer of reinforcing fiber such as, for example, a weave of reinforcing fiber. In some embodiments, the one or more layers for forming composite might be placed on a press mold for the shape of one or more of the elements of the tray table assembly such as, for example, a corrugated composite structure, with the press mold then being used to consolidate the one or more layers of composite (e.g. the one or more layer of reinforcing fibers with the two or more layers of thermoplastic, thereby forming the composite element(s).

In a typical embodiment, the array of fibers of the composite material would be located near the center thickness of the composite material such as, for example, in a central plane, with thermoplastic material located atop and beneath the array of fibers. In other words, the composite material would typically have all of the reinforcing fibers located in a single/central plane, with the rest of the thickness of the composite material being formed of thermoplastic material. Regardless, the composite typically might provide approximately consistent fiber distribution and, in some embodiments, orientation throughout the element, so that it can provide precise and consistent/reproducible structural and/or mechanical support.

FIG. 1 illustrates an exemplary one-piece non-folding tray 100, although similar embodiments would include other tray designs such as, for example, a bi-fold tray. In the disclosed tray embodiments of FIGS. 1-3, the composite material, typically having an array of reinforcing fibers 125 encapsulated within thermoplastic sheathing material 127 may be formed into a corrugated composite structure 120, which composite structure 120, may in effect serve as internal support struts for the tray 100. The corrugated composite structure 120 may comprise a single layer of composite, or in other embodiments, the corrugated composite structure 120 may comprise a plurality of composite layers such as, for example, two overlaid layers or sheets bonded together into an integral whole with the number of layers typically dependent upon the structural strength and rigidity needs of the tray. The corrugated composite structure 120 typically comprises a plurality of peaks 122 and valleys 123, with the peaks 122 typically defining an upper surface of the corrugated composite structure, which would contact and/or be attached to an upper cover sheet to form the upper surface of the tray, and the valleys 123 typically defining the lower surface of the corrugated composite structure, which would contact and/or be attached to a lower cover sheet to form a lower surface of the tray. In the embodiment of FIG. 2, all peaks 122 are typically located approximately in a single upper plane and all valleys 123 are typically located approximately in a single lower plane. Typically the corrugated composite structure 120 has an upper surface associated with the peaks, a lower surface associated with the valleys, and a perimeter with exterior side edges. While the embodiment shown in FIG. 2 has corrugations spaced approximately evenly, in other embodiments the corrugations may be spaced in any manner as desired to provide internal support to the tray. While the embodiment in FIG. 2 has corrugations that are approximately uniform in size/height that is, for example, the thickness of the tray is approximately uniform, in other embodiments the corrugations might vary in size/height that is, for example, if the tray has a non-uniform thickness.

Located about the perimeter side edges of the corrugated composite structure 120 is a thermoplastic frame structure 130. The thermoplastic frame structure 130 typically might comprise a thermoplastic material that is the same chemical composition as that of the composite. In some embodiments, the thermoplastic frame structure 130 may also be reinforced with suitable fibers, for example carbon and/or graphite and/or glass and/or aramid fibers dispersed within the thermoplastic resin material during injection molding of the thermoplastic frame structure 130 onto the corrugated composite structure 120. The thermoplastic frame structure 130 may be thermally and/or homogeneously affixed or otherwise connected to the perimeter of the corrugated composite structure 120, for example by chemical bonding, for example, of the sort that might occur by injection molding the thermoplastic frame structure 130 onto the corrugated composite structure 120.

The tray 100 typically also comprises two cover sheets 151, 152, which may be used to skin the tray to provide an upper and lower surface for the tray 100. While the cover sheets 151, 152 might be formed of any suitable material that could be joined/attached to the thermoplastic frame structure 130 and/or the corrugated composite structure 120, typically the cover sheets 151, 152 might comprise thermoplastic that is, for example, the same thermoplastic material as the thermoplastic frame structure and/or the corrugated composite structure. In some embodiments, the two sheets 151, 152 would each comprise composite material, which may be the same composite material as used for the corrugated composite structure 120. In some embodiments, the two sheets 151, 152 might each be formed of a plurality of layers of composite bonded together.

An upper cover sheet 151 is located atop, and typically in contact with, the corrugated composite structure 120 (e.g. on the upper surface of the corrugated composite structure, for example, contacting a plurality of peaks 122), while a lower cover sheet 152 is located beneath, and typically in contact with, the corrugated composite structure 120 (e.g, on the lower surface of the corrugated composite structure, for example contacting a plurality of the valleys 123). The two cover sheets 151, 152 may also typically contact the thermoplastic frame support 130, for example, at the perimeter edges of each cover sheet. The cover sheets 151, 152 would each be rigidly/securely affixed or attached or joined to the thermoplastic frame structure 130 and/or the corrugated composite structure 120. For example, in some embodiments, the cover sheets would each be attached to each peak 122 or valley 123 in the corresponding surface of the corrugated composite structure 120 and to the thermoplastic frame structure 130.

While in some embodiments, the two cover sheets 151, 152 might be attached via adhesive, in other embodiments, in which the two cover sheets 151, 152, the thermoplastic frame structure 130, and/or the corrugated composite structure 120 each comprise the same thermoplastic material, the two cover sheets 151, 152 might be attached thermally (e.g. using ultrasonic welding) to form homogeneous connections. In some embodiments, homogeneous connections might be formed throughout the tray 100, that is, for example, at a plurality of attachment/contact points between elements. By using the same thermoplastic material throughout the tray 100, the corrugated composite structure 120, thermoplastic frame structure 130, and the cover sheets 151, 152 may be chemically bonded to form the tray as a unitary whole with homogeneous connections. In some embodiments, the cover sheets 151, 152 are molded flat covers such that a perimeter edge of the thermoplastic frame structure 130 remains exposed after attachment of the cover sheets 151, 152. In other embodiments, the cover sheets 151, 152 are formed with side flanges to enclose the perimeter edge of the thermoplastic frame structure 130 upon attachment of the cover sheets 151, 152.

In some embodiments, the composite material of the tray such as, for example, the corrugated composite structure and/or the cover sheets, may be multi-layered, that is, formed of two or more layers of composite. This layering of composites may provide for additional structural support for the element. While some embodiments may require multi-layered composite support throughout the element, in other embodiments a single layer of composite may be used for most of the element, with additional layer(s) used only in critical areas of the element requiring greater structural support. Typically, the multiple layers of composite may be securely affixed via, for example, fused together, as by ultrasonic welding, thermal staking, thermal welding, or other such joining means. In some embodiments, the multiple layers of composite may be oriented so that the reinforcing fibers of each layer are oriented differently. By altering the fiber orientation of the layers, the joint composite may provide additional strength.

Figure 3:
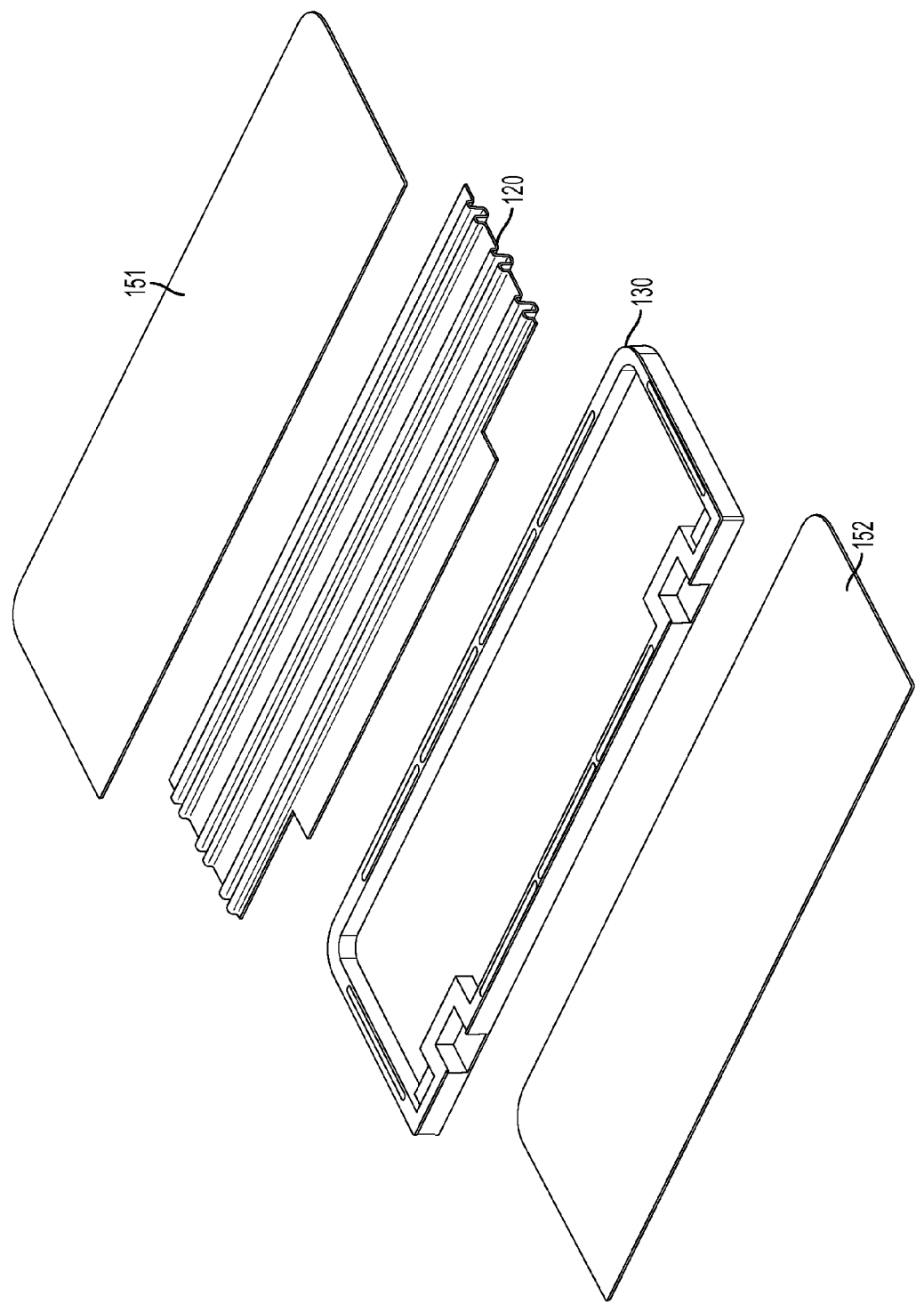
FIG. 3 is an exploded view of an exemplary tray table showing the corrugated composite structure, the thermoplastic frame structure for framing a perimeter of the corrugated composite structure, and the upper and lower cover sheets for forming the upper and lower surfaces of the tray table; in this embodiment, the thermoplastic frame structure is securely attached to the exterior edges of the corrugated composite structure, and the upper and lower cover sheets are securely attached to the corrugated composite structure and/or the thermoplastic frame structure (for example, with the upper cover sheet contacting the peaks of the corrugated composite structure and the lower cover sheet contacting the valleys of the corrugated composite structure)

In the embodiment of FIGS. 1-3, the thermoplastic material of the corrugated composite structure 120, the thermoplastic frame structure 130, and the cover sheets 151, 152 typically may be the same thermoplastic material, that is, having the same chemical composition. While any semi-crystalline or amorphous thermoplastic might be used, the common thermoplastic material might, for example, comprise polycarbonate, polyphenylene sulfide, polyetherimide, or other suitable thermoplastic materials. By using the same thermoplastic material throughout the tray, thermal, homogeneous, and/or chemical attachment (bonding) may occur, securely affixing the corrugated composite structure 120, the thermoplastic frame structure 130, and the cover sheets 151, 152 into an integrated whole. In other words, use of the same chemical composition of thermoplastic material may provide chemical fusing, for example, during thermal injection molding and/or ultrasonic welding, to form a unitary/unified structure throughout the tray 100 typically with a homogeneous connective interface between the various elements forming the tray and resulting in secure attachment, connection, and/or joining of the corrugate composite structure, the thermoplastic frame structure, and/or the cover sheets.

Figure 4:
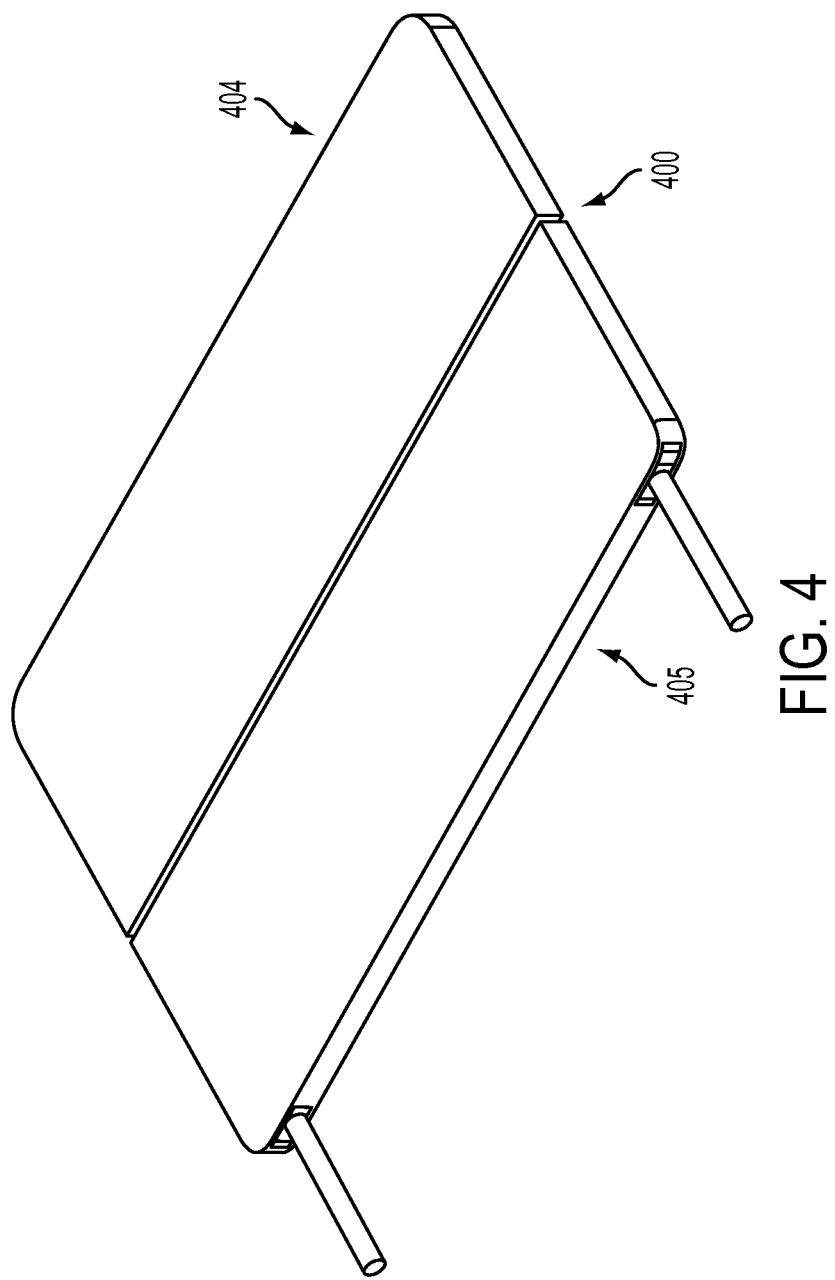
FIG. 4 is a perspective view of an exemplary bi-fold tray table embodiment.
Figure 5:
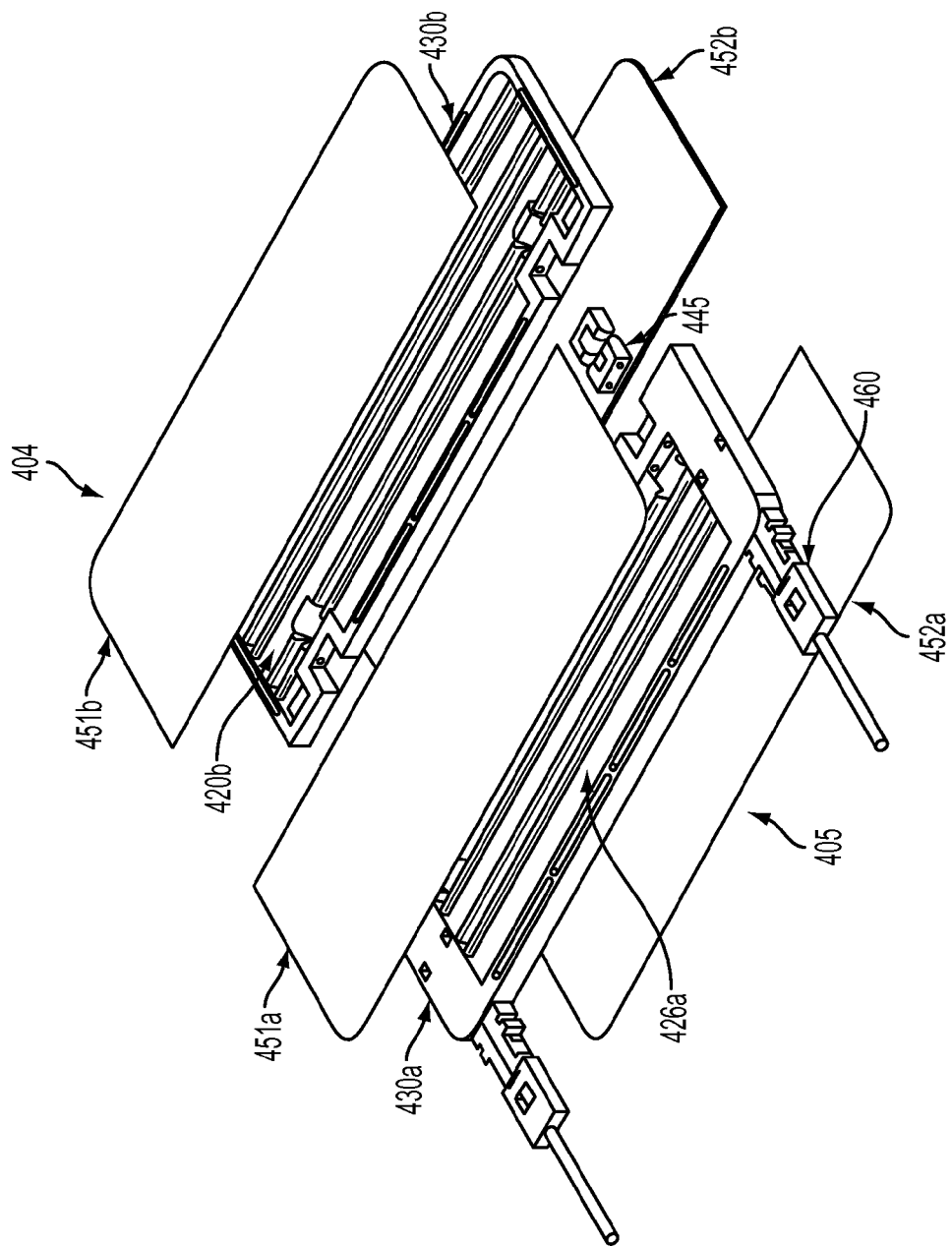
FIG. 5 is an exploded perspective view of the tray of FIG. 4.

FIGS. 4-14 illustrate alternative tray embodiment examples. While the embodiments depicted in FIGS. 4-14 show a bi-fold tray 400, having a tray table front assembly 404 joined to a tray table rear assembly 405 via hinge assemblies 445, it should be understood that other, similar embodiments might have different tray configurations such as, for example, a single, unitary tray without hinges between tray table elements for folding. FIG. 4 illustrates a tray embodiment comprising a tray table front assembly 404 and a tray table rear assembly 405. FIG. 5 illustrates the components of an exemplary tray in an exploded perspective view, in which each tray table assembly (e.g. the front and rear) comprises a composite structure 420(a and b), a thermoplastic frame structure or assembly 430(a and b), an upper cover sheet 451(a and b) and a lower cover sheet 452(a and b). Additionally, since the tray in FIG. 5 is a bi-fold tray, the tray also includes hinge assemblies 445 (e.g. a plurality of hinges allowing the tray table front assembly to fold with respect to the tray table rear assembly). In the embodiment of FIG. 5, the thermoplastic frame assembly 430 may also comprise a snap-fit receiving element or receptacle for a detachable linear bearing support as will be discussed in more detail below.

Figure 6:
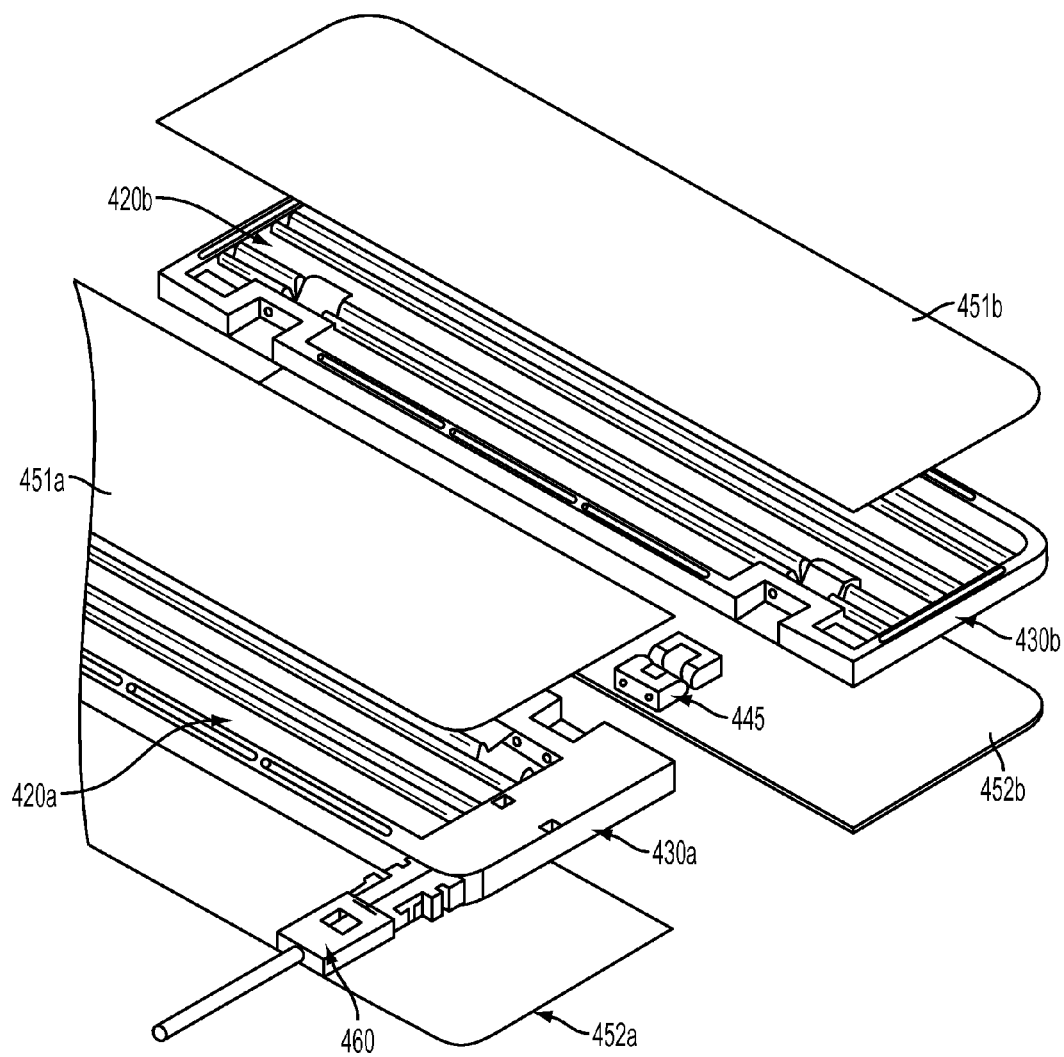
FIG. 6 is an enlarged view of the tray of FIG. 5.

In FIG. 5, the composite structure 420 is a corrugated composite structure having a plurality of corrugations. For example, in FIG. 5 the corrugated composite structure may be formed of a composite sheet having a plurality of corrugations. The corrugations may be spaced as desired for tray table upper and lower surface support, for example, to support the cover sheets. In FIG. 5, for example, several corrugations may be grouped together, for example, spaced fairly closely, with a larger span (typically of flat composite) between several such groups of corrugations. In FIG. 5, the tray has a uniform thickness, so the corrugations on the corrugated composites structure would typically be approximately uniform in height so that the peaks of all of the corrugations would all have the same height and be in the same plane, and the valleys of all of the corrugations would all have the same depth and be in the same plane. In other embodiments in which the tray may not have uniform thickness, however, corrugations may not be of uniform height. There may be some variance in the height of the corrugations, for example based on their location in the tray. FIG. 6 illustrates the tray components in an enlarged exploded perspective view.

Figure 7:
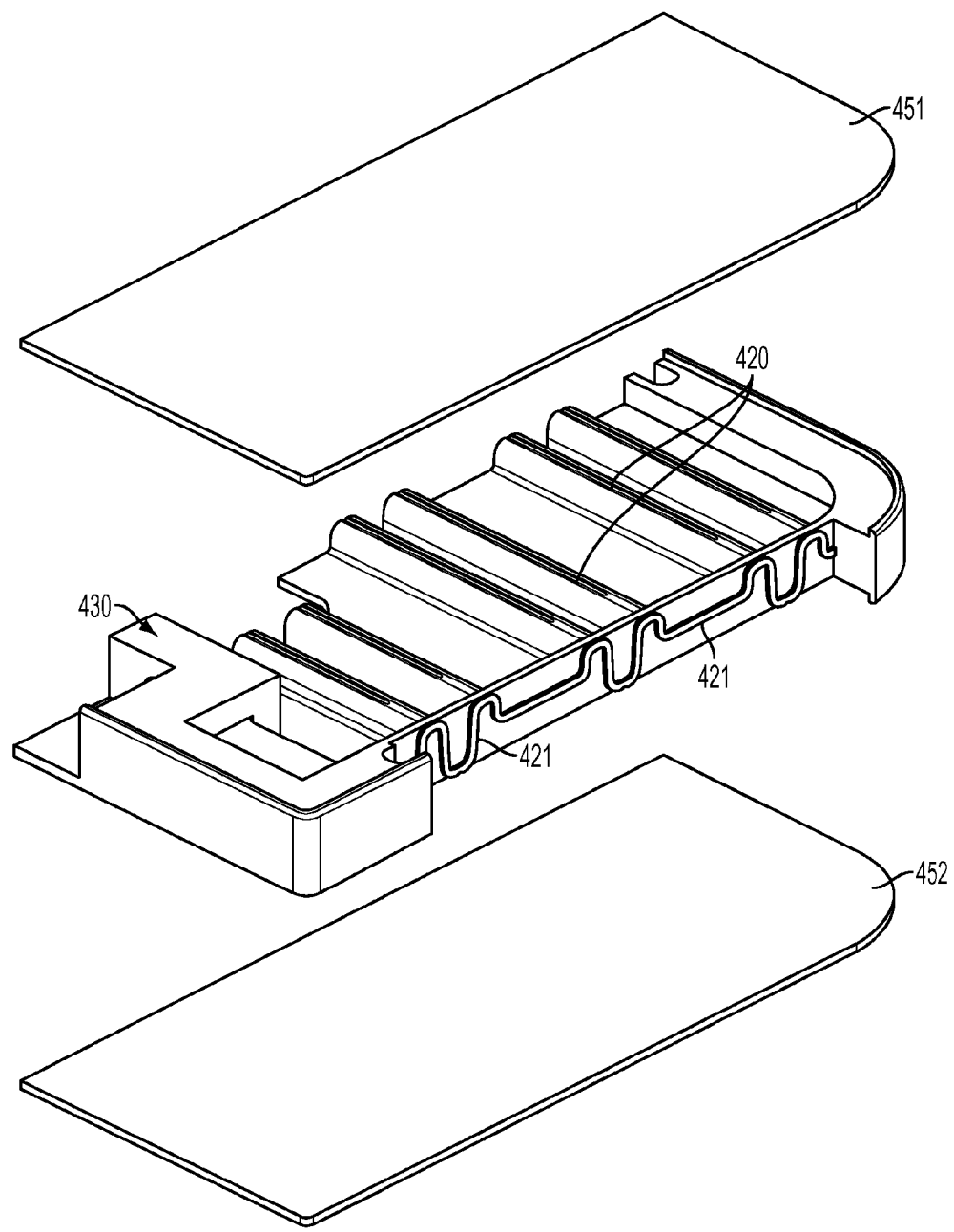
FIG. 7 is an exploded sectional view of the tray of FIG. 6.

FIG. 7 illustrates a sectional view of such a tray embodiment and illustrates the homogeneous connective interface 421 between the thermoplastic frame 430 and the composite structure 420. Typically, the thermoplastic frame assembly or structure 430 would be homogeneously attached to the corrugated composite structure 420 such as, for example, by thermal or chemical bonding, since the composite material and the thermoplastic frame would comprise the same thermoplastic material, with the thermoplastic frame typically being injection molded about the corrugated composite structure. Further, the shape of the corrugations of the corrugated composite structure 420 can be more clearly seen in FIG. 7.

Figure 8:
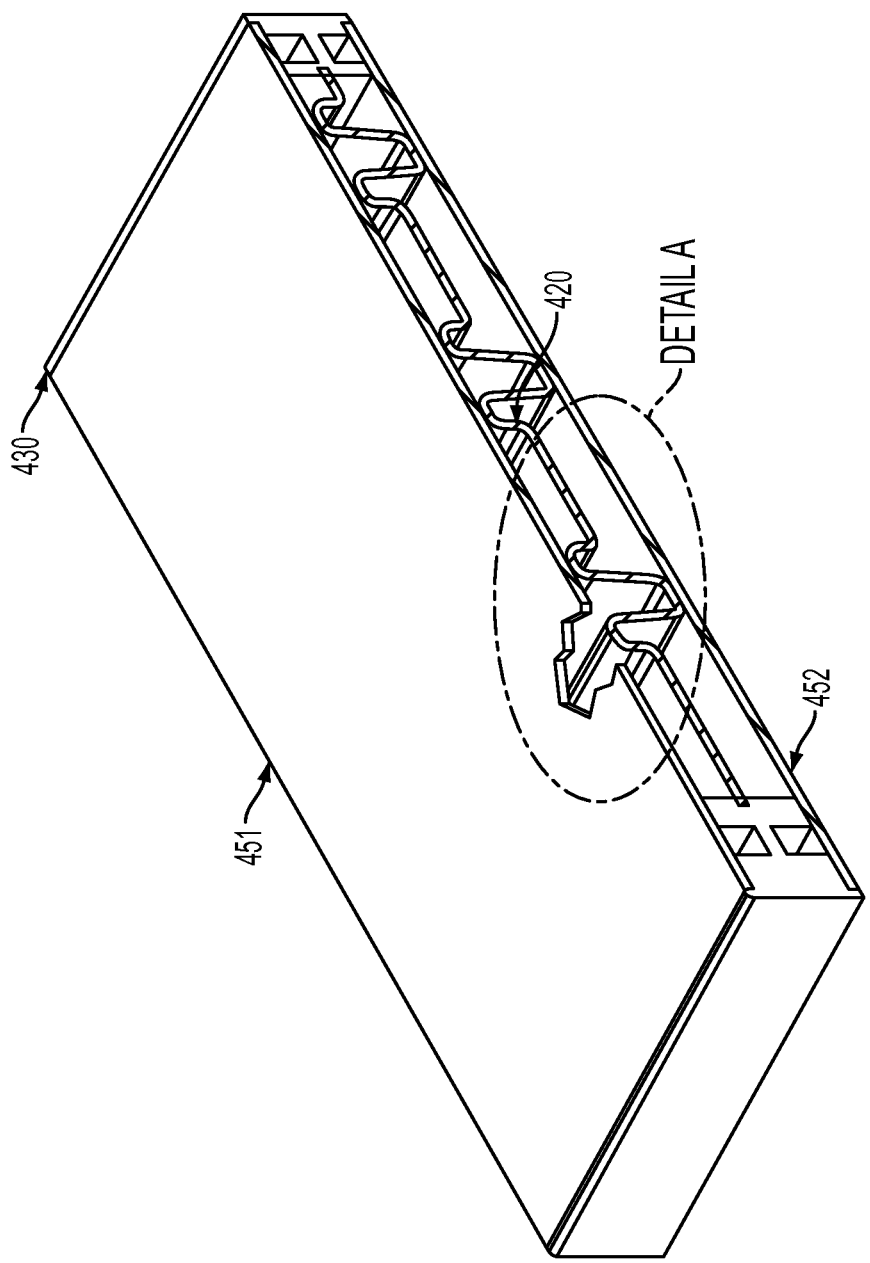
FIG. 8 is a cross-sectional view of an exemplary tray (such as that shown in FIG. 4)

FIGS. 8-9 illustrate a cross-sectional view of an exemplary tray table embodiment, showing how the components of the tray fit together. Typically, the thermoplastic frame 430 is located about, in contact with, and attached to the side perimeter edges of the corrugated composite structure 420; and the upper cover sheet 451 may be located atop the peaks of the corrugations of the corrugated composite structure 420, with the lower cover sheet 452 located beneath the valleys of the corrugations of the corrugated composite structure 420. The upper and lower cover sheets would typically be attached to the corrugations of the corrugated composite structure and/or the corresponding surface of the thermoplastic frame (e.g. with the upper sheet attached to the upper surface of the thermoplastic frame and the lower cover sheet attached to the lower surface of the thermoplastic frame). FIG. 8 also shows a particular exemplary corrugation pattern for the corrugated composite structure, in which two peaks surround a valley as a grouping, with such groupings separated by a span of fairly flat composite material.

Figure 9A:
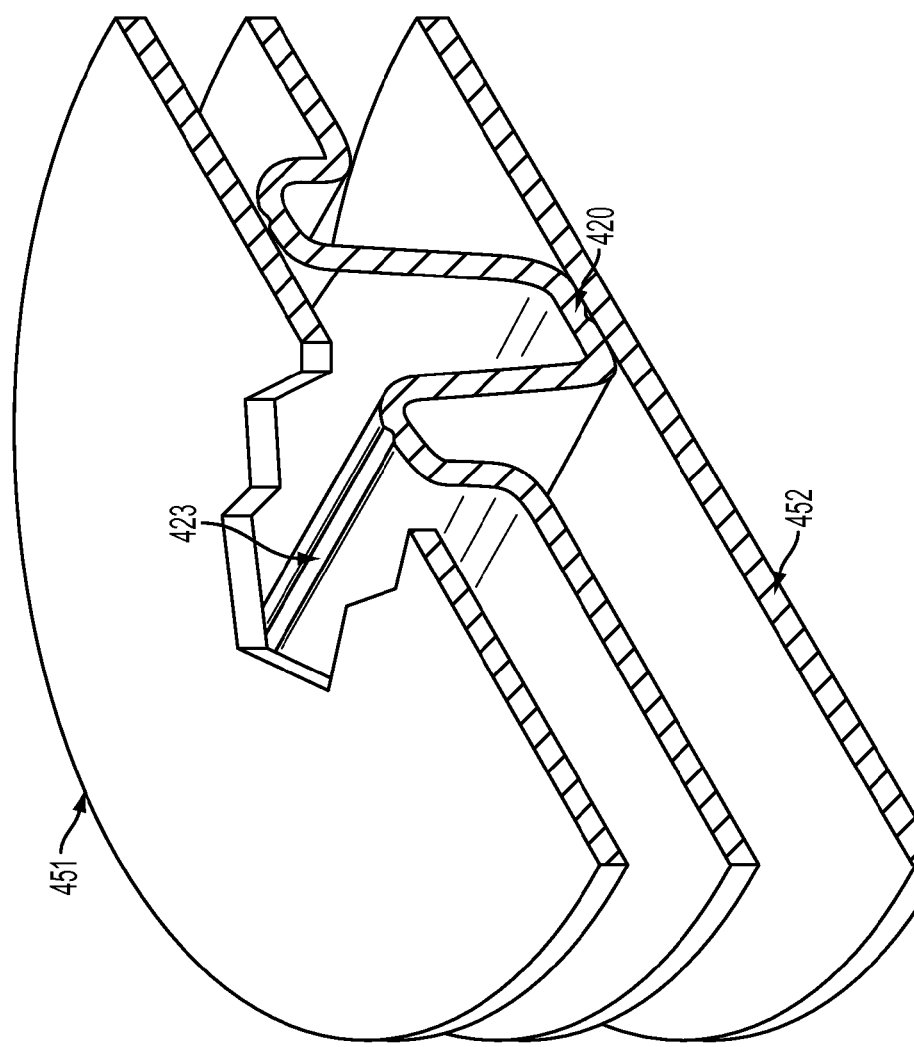
FIG. 9A is an enlarged view of Detail A of FIG. 8, showing a channel attachment assistance feature
Figure 9B:
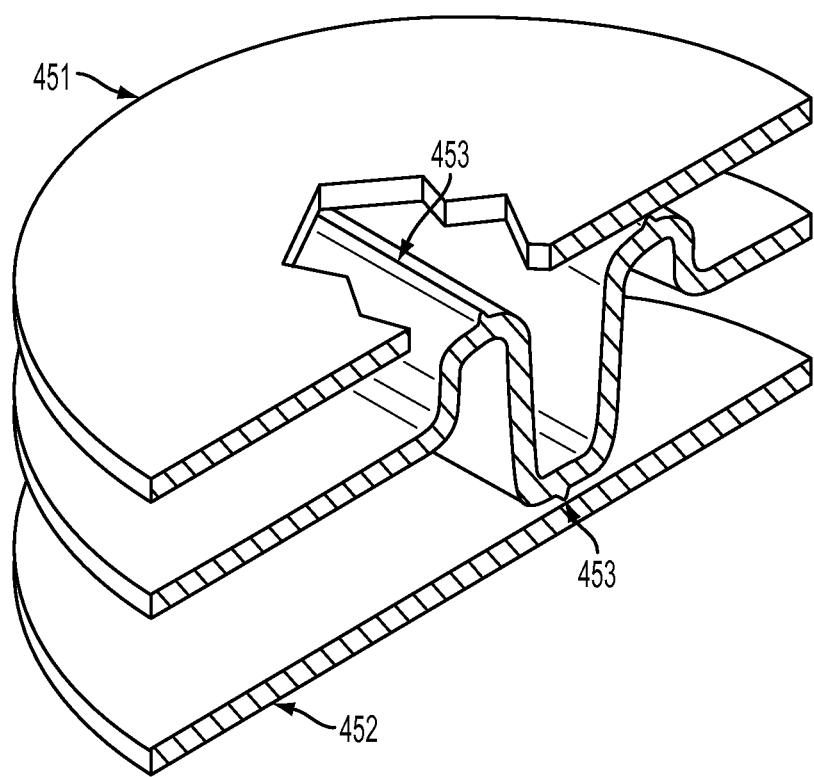
FIG. 9B is an enlarged view of Detail A of FIG. 8 showing an energy director attachment assistance feature.

FIG. 9 illustrates an enlarged detail view of the cross-section shown in FIG. 8. In FIG. 9, an additional optional feature is visible. Specifically, an attachment assistance feature is shown as being located atop some or all of the peaks and valleys of the corrugations of the corrugated composite structure 420. The attachment assistance feature may be operable to assist in forming a secure attachment between the cover sheets and the corrugations of the corrugated composite structure. In FIG. 9A for example, the attachment assistance feature is a channel or groove 423 in the upper surface of the peaks and lower surface of the valleys of the corrugated composite structure 420. For example, a thermally formed channel may be formed in each peak and valley, with the channel 420 operable to retain adhesive for bonding the cover sheets 451, 452 to the corrugated composite structure 420 (e.g. to hold a bead of adhesive). Typically, such a channel would be formed in the thermoplastic material of the composite but typically would not be deep enough to contact the reinforcing fibers. In alternative embodiments, as shown in FIG. 9B, the attachment assistance feature may be an energy director 453 (e.g. a small spike or tip) for ultrasonic welding. Such energy directors might be located on a plurality (or all) of the peaks and valleys of the corrugated composite structure 420, and might allow for ultrasonic welding of the cover sheets 451, 452, which cover sheets are typically made of the same thermoplastic material as the composite to the corrugated composite structure 420. Typically, the energy director(s) would be an extension of the thermoplastic material encapsulating the reinforcing fibers of the composite.

Figure 10:
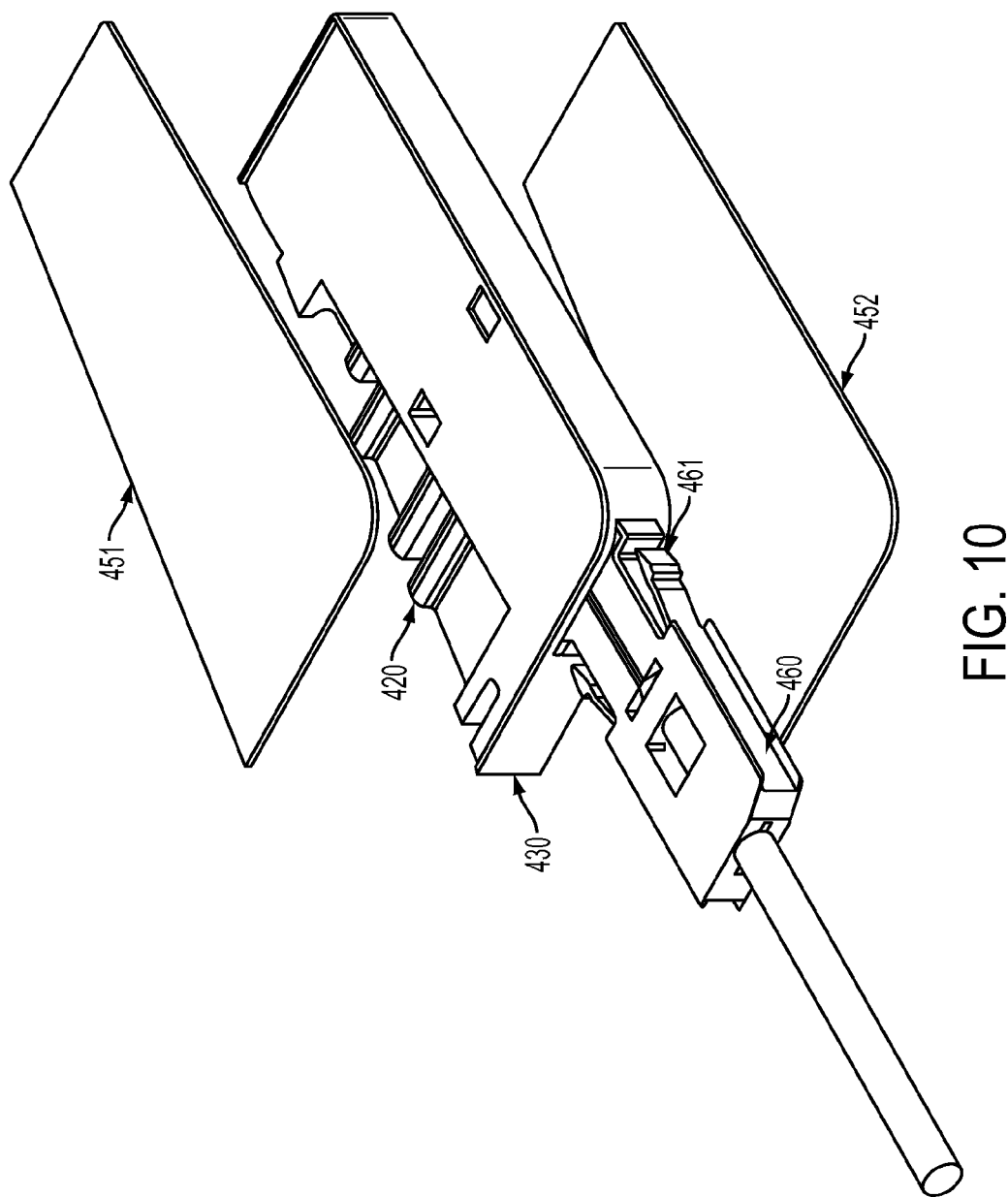
FIG. 10 is an exploded perspective view of a section of an exemplary tray and a linear bearing support.
Figure 11:
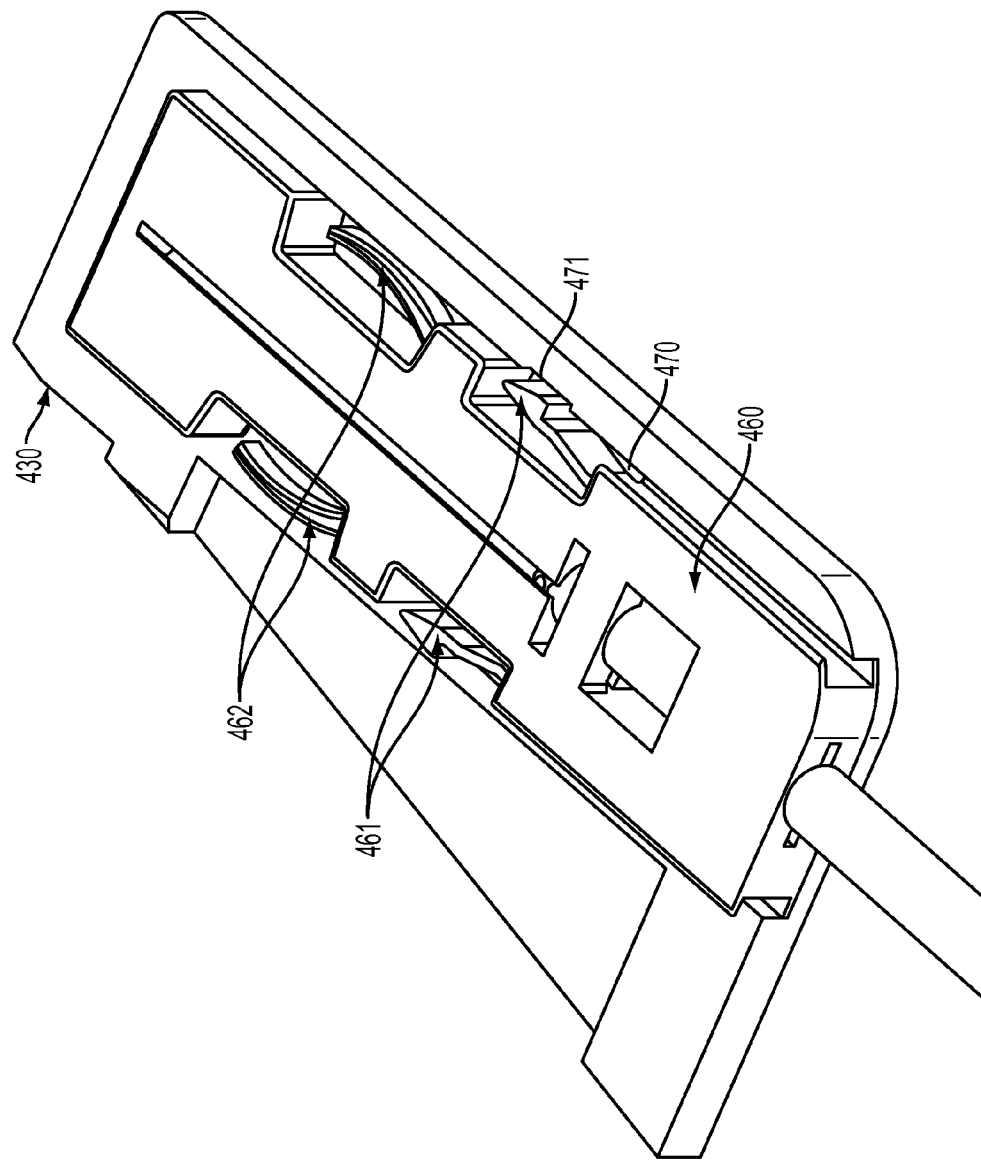
FIG. 11 is a sectional view of the linear support bearing of FIG. 10 in place within the tray of FIG. 10, engaging snap-fit retention.

FIGS. 10-14 illustrate the way that, in some embodiments, the thermoplastic frame assembly or structure 430 might be formed/configured to have a snap-fit receptacle 470 and to accept a snap-fit installed linear bearing support 460. In the embodiments of FIGS. 10-14, the tray table would comprise a snap-fit receptacle 470, that is, an opening or slot of corresponding size and shape operable to accept or receive a snap-fit installed linear bearing support 460 disposed, for example, on the end of one or more arms for supporting the tray table. In the embodiment of FIGS. 10-11, the snap-fit receptacle 470 is integrated into the thermoplastic frame assembly/structure 430 such as, for example, on the side ends of the thermoplastic frame. This allows easy removal and/or replacement of a tray, without the need to disassemble the tray in order to remove the tray table from the tray arms.

FIG. 11 is a cross-sectional view showing the manner in which an exemplary linear bearing support 460 interacts with its corresponding snap-fit receptacle 470 in the tray table. The snap-fit receptacle 470 of FIG. 11 is a slot or opening sized to correspond to the linear bearing support 460, and comprising a recess 471 or ledge located and oriented and configured to interact in a snap-fit manner with the snap-fit element 461. The snap-fit element 461 is, for example, an integral compliant retention feature of the linear bearing support 460. In the embodiment of FIG. 11, the linear bearing support 460 comprises a snap-fit element 461 having a projection, configured to engage the snap-fit recess 471 or ledge in the snap-fit receptacle 470, located on a biasing member that biases the snap-fit element outward so that when the linear bearing is inserted into the snap-fit receptacle of the thermoplastic frame to the depth corresponding to the snap-fit recess or ledge, the projection of the snap-fit element will engage the recess or ledge to form a secure snap-fit lock therebetween thereby preventing removal of the linear bearing support from the tray. Typically, the snap-fit element 461 is located on at least one side of the linear bearing support 460. In some embodiments, the snap-fit element 461 is located on at least two sides of the linear bearing support. Additionally, in some embodiments the linear bearing support 460 may further comprise one or more spring pre-load elements 462 (e.g. integral compliant tension member) operable to exert outward force on the sidewalls of the snap-fit receptacle 470, in order to reduce movement of the linear bearing support 460 in the snap-fit receptacle 470 thereby providing a more secure fit to minimize rattling, for example. Typically, the spring pre-load element 462 would be located on at least two opposite sides of the linear bearing support 460. In some embodiments, such springs might be located on additional opposite sides such as, for example, both left and right sides and the top and bottom, of the linear bearing support. FIG. 11 illustrates a tray embodiment having a linear bearing support that interacts with a corresponding snap-fit receptacle within the tray table. In some alternative embodiments, the linear bearing support may permanently attach to the tray table assembly, such that the bearing may not be easily removable.

Figure 12:
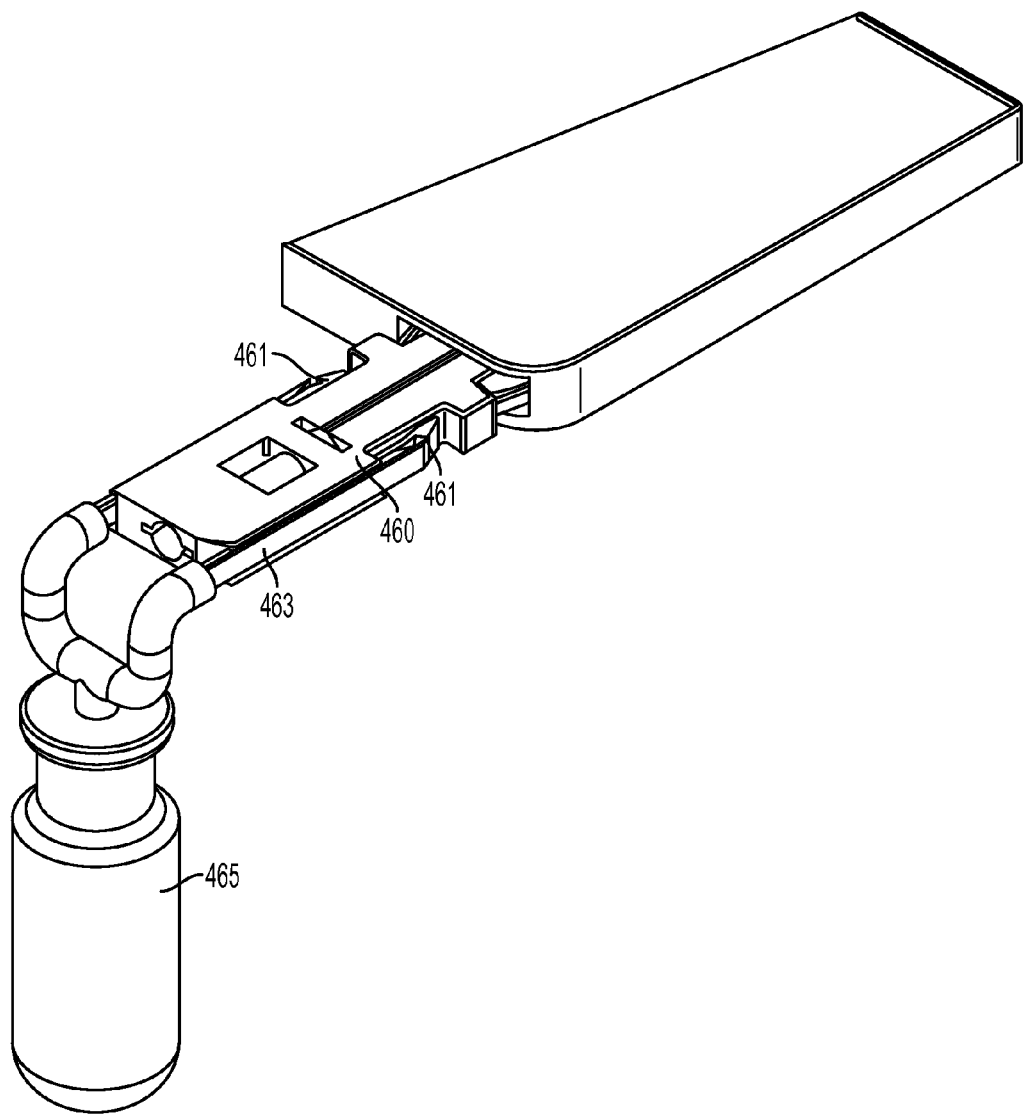
FIG. 12 illustrates an extractor tool for removing the linear bearing support from the tray of FIG. 11.
Figure 13:
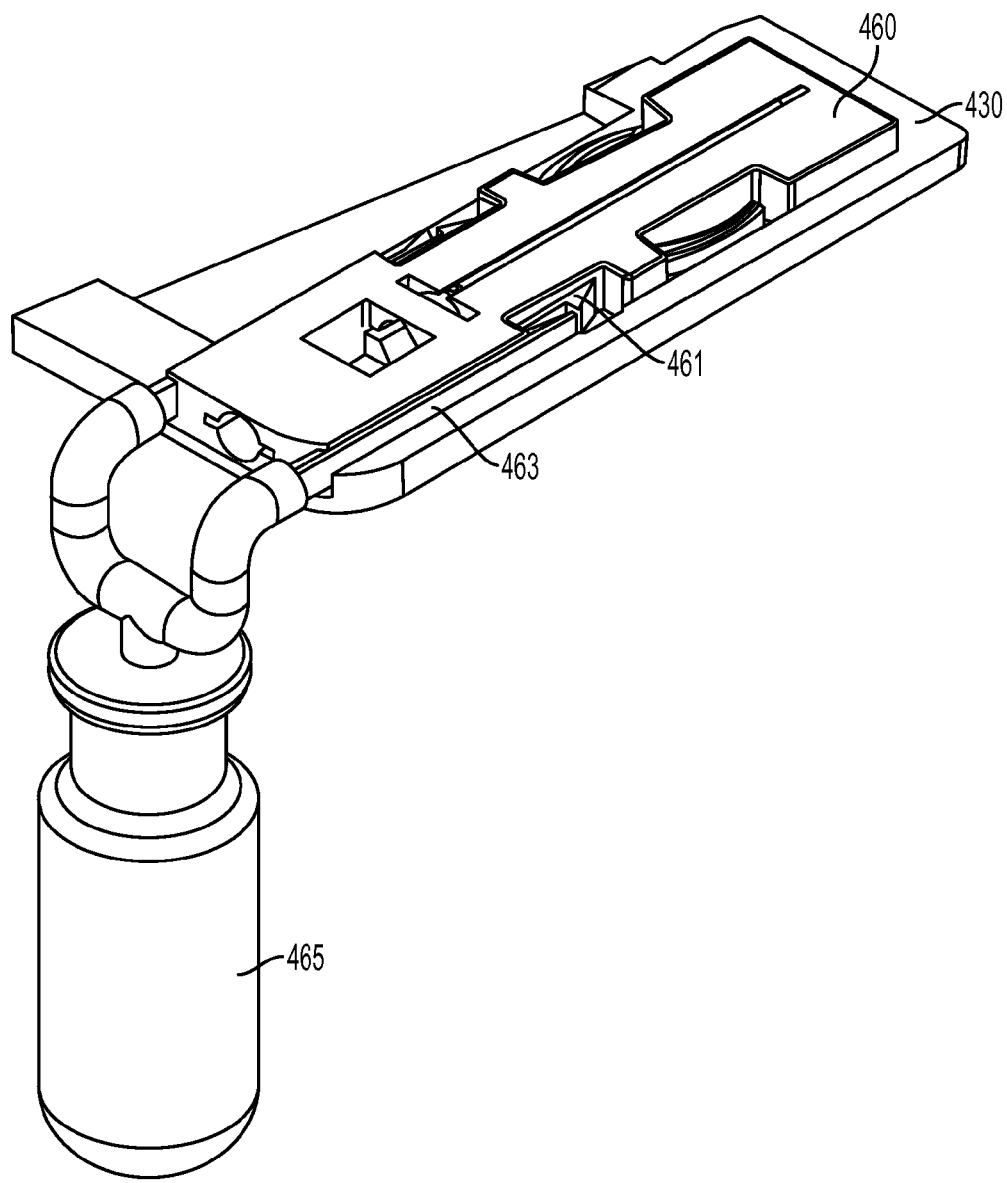
FIG. 13 is a sectional view illustrating interaction of the extractor tool with the linear bearing support and the tray.
Figure 14:
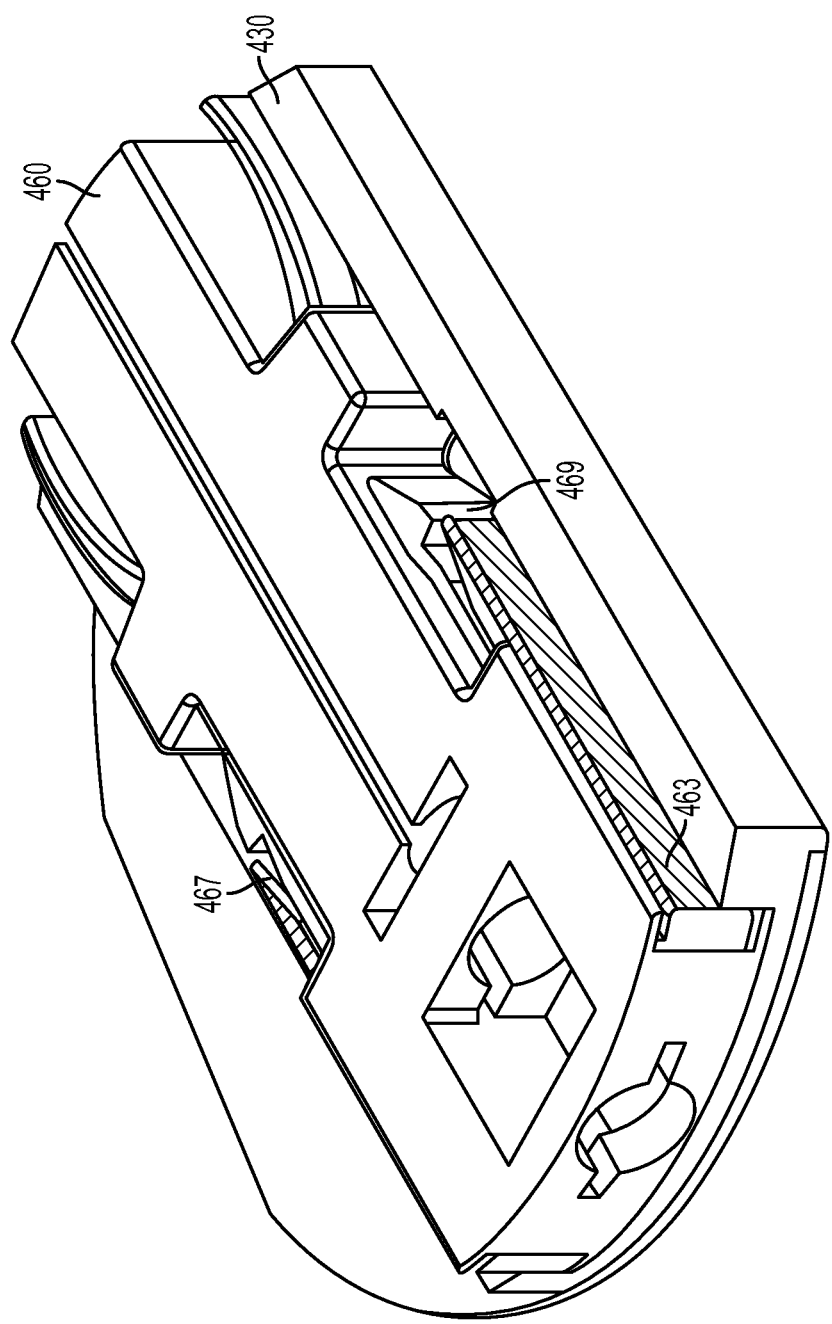
FIG. 14 is an enlarged section of FIG. 13, further illustrating interaction of the extraction tool with the snap-fit elements of the linear bearing support to allow for disengagement of snap-fit retention and extraction of the linear bearing support from the tray.

FIGS. 12-14 illustrate an exemplary linear bearing support extractor tool 465, and how it interfaces with the elements of at least one of the linear bearing support and the frame to allow for easy extraction of the snap-fit linear bearing support from the tray and, more specifically, from the snap-fit receptacle of the tray table. The extractor tool 465 typically has extended prong(s) 463 operable to fit into slots formed in the linear bearing support extending to the snap-fit element 461 of the linear bearing support. By inserting the extractor tool's prongs 463 into the slot(s) of the linear bearing support 460, the snap-fit elements' projection can be retracted (inward) away from the snap-fit recess or ledge in the snap-fit receptacle such as, for example, by actuating the compliant retention feature, typically by interaction with the projection and/or based on the design/shape of the projection and/or prongs. In some embodiments, the slots may be formed in the thermoplastic tray assembly 430. As FIG. 14 illustrates, the tip of the prongs 463 of the extractor tool 465 may be shaped with a wedge 467 that corresponds to an inverse wedge 469 located on the projection of the snap-fit element. This may allow for the prongs of the extractor tool to wedge the snap-fit element inwards as the extractor tool is inserted into the slots of the linear bearing support, thereby disengaging the projection from the recess or ledge. Tray using this type of detachable linear bearing support may greatly improve removal and replacement of tray tables.

Figure 15:
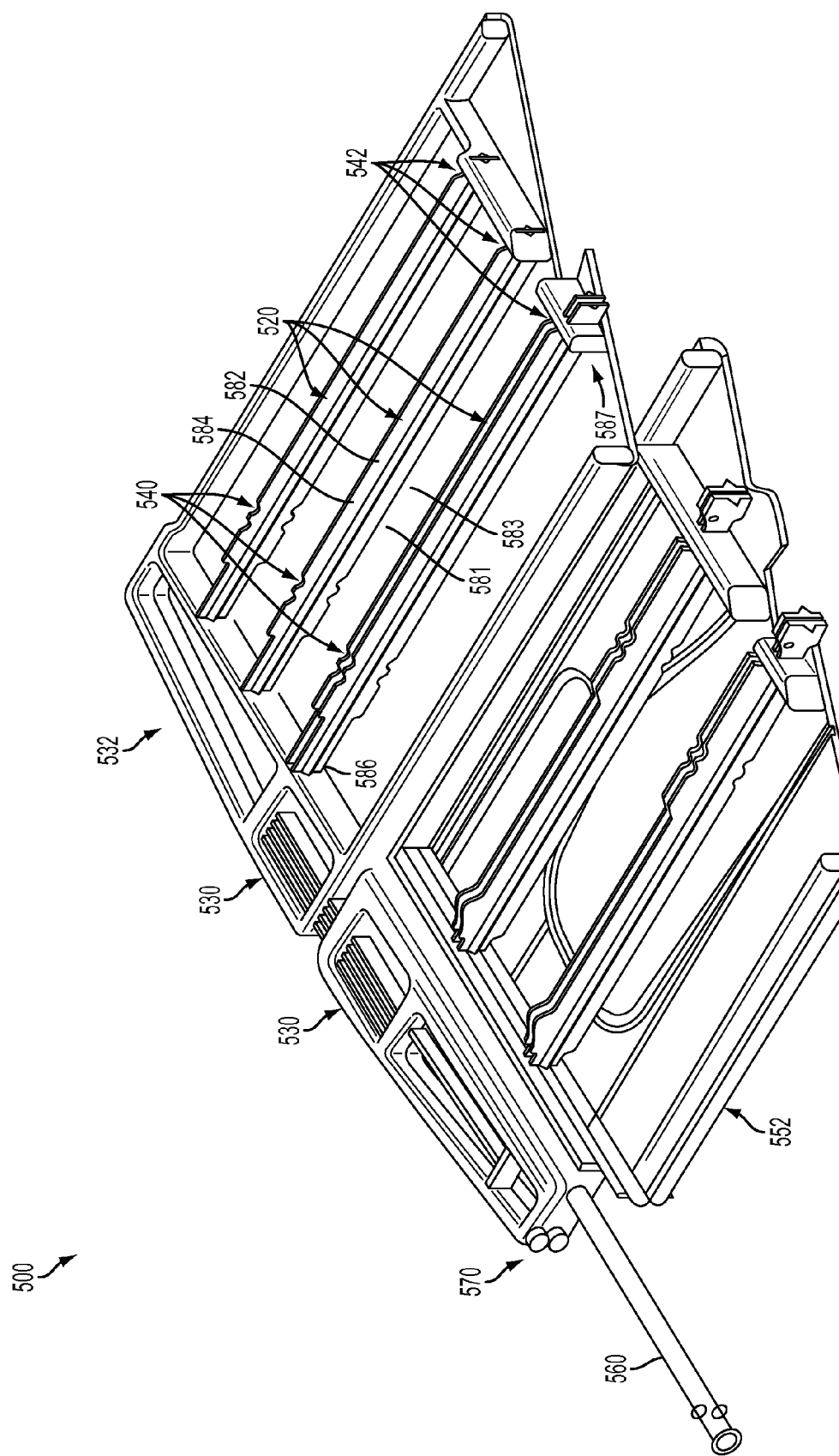
FIG. 15 is a perspective, partial view of an alternative exemplary tray table embodiment wherein the top cover(s) are removed for clarity in displaying the internal components/elements.
Figure 16:
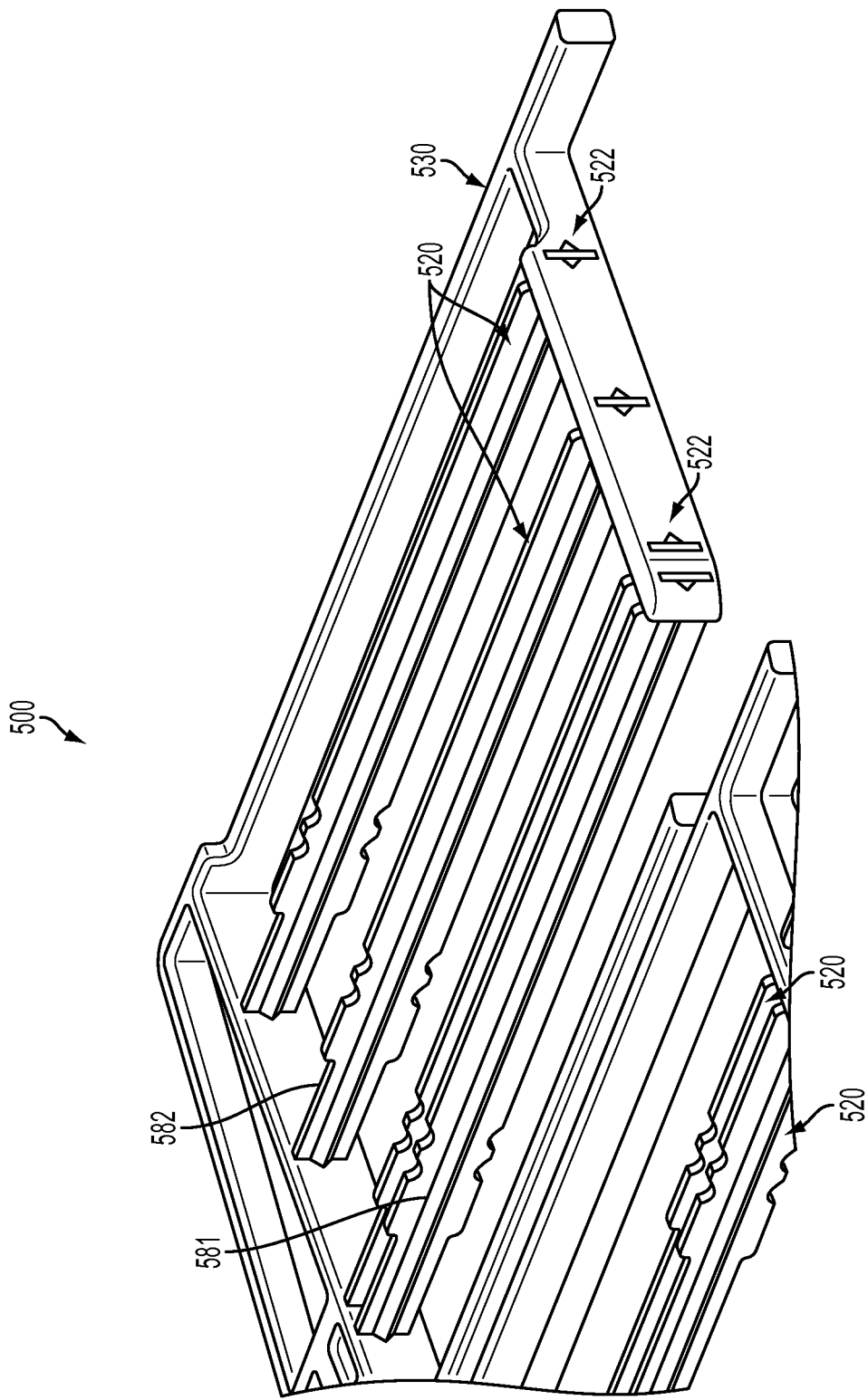
FIG. 16 is a cross-sectional perspective view of the tray table of FIG. 15.
Figure 17:
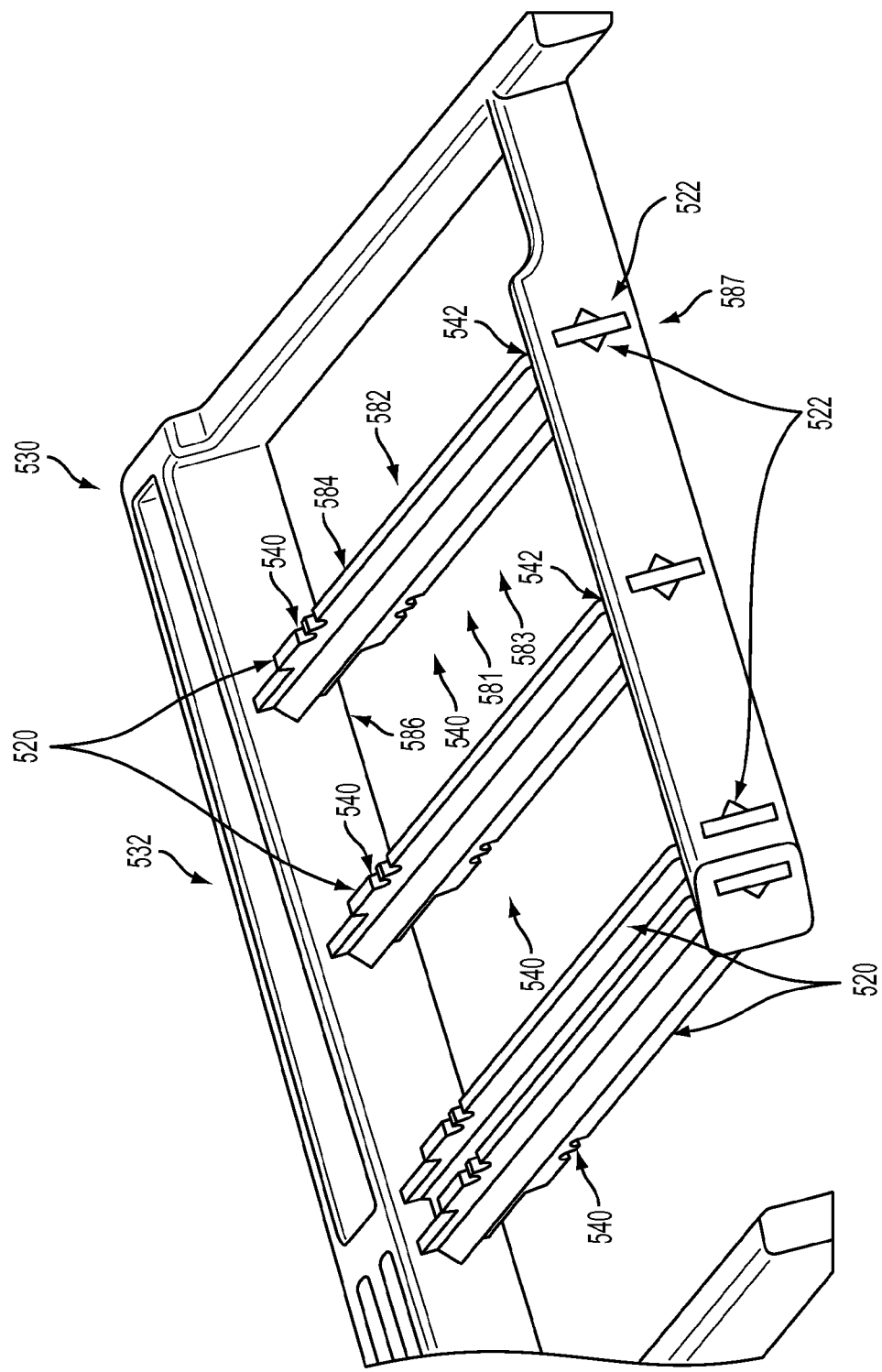
FIG. 17 is a perspective view of the composite elements of the tray table embodiment of FIG. 15 within the thermoplastic frame, wherein the top and bottom covers have been removed for clarity in showing the tray table structured assembly.

FIGS. 15-17 illustrate an alternative tray embodiment, similar in many ways to the embodiments described above, in which the structural spacing elements comprise a plurality of composite elements such as, for example, composite strips cut from composite sheeting oriented vertically for example so that the array of reinforcing fibers in the central plane of the composite extends vertically and placed/oriented to serve as support beams or struts extending across the tray. Typically, the top and bottom edge surfaces of the composite elements function as the upper and lower surface support feature for each composite element, jointly forming the support surface for each composite element, jointly forming the support surface for the encasing cover sheets that form the upper and lower surface of the tray. As disclosed above, the composite elements typically are located within (and attached to) a thermoplastic frame structure typically located at least about the perimeter of the plurality of composite elements to form the tray table perimeter and/or link the plurality of composite elements together to form the tray table structure assembly. The cover sheets are then attached/affixed to the tray table structure assembly with the upper cover sheet attached to the upper support surface and the lower cover sheet attached to the lower support surface.

In some embodiments, one or more of the composite elements may comprise integral thermoplastic rib elements, extending horizontally along one or both sides of the composite. In some embodiments, the composite elements may also comprise apertures, with the rib elements interacting with the apertures to integrate/lock the rib to its corresponding composite element. And in some embodiments, the rib element for each such composite element could typically be located vertically near or at the center of the composite element (e.g. half-way up the vertical height of the composite element.

Typically, the plurality of composite elements would be arranged in parallel to each other. In some embodiments, the composite elements might be evenly spaced, but in other embodiments, the composite elements might have some other non-uniform spacing based on the specific needs of the specific tray table design. And while typically the entire perimeter of the tray table might be formed by the thermoplastic frame, in other embodiments, on one more of the composite elements might form one or more of the perimeter side edges of the tray table, for example with the remaining side edges of the tray table being formed of the thermoplastic support frame.

Turning now specifically to the detailed figures of the alternative embodiments, FIG. 15 illustrates another embodiment of a tray table assembly 500 comprising a bottom cover 552. A top cover which has been removed for clarity in this figure. The tray table assembly 500 may comprise a thermoplastic frame assembly 530 and one or more composite elements 520. Typically the plurality of composite elements are spaced apart in parallel configuration, wherein the frame assembly 530 may be injection molded and homogenously attached to the thermoplastic material of the composite elements 520. In some embodiments, the composite elements 520 may comprise a series of parallel composite elements 520, wherein the composite elements 520 may be spaced evenly or at varying distances along the tray table assembly 500. In some embodiments, the composite elements 520 (and possibly the frame assembly 530) may comprise application specific notches, such as webbing notches 540 and/or joining notches 542. In some embodiments, webbing notches 540 may be utilized to (temporarily) connect (or hold) the composite elements 520 via a web during cutting, molding, and other manipulations of the composite elements 520. In some embodiments, for example, the composite elements 520 might be bound together by webbing to allow for a single cutting operation to cut the profile of all composite elements. In some embodiments, joining notches 542 may be located at the ends 586 and 587 of the composite elements 520, wherein the composite elements 520 may be joined to the frame assembly 530 at least partially via the joining notches 542 (which, for example, might be located at intersections to assist in injection molding of the frame to better form perpendicular frame members). Other notches in the composite elements 520 may allow space for recesses in the tray cover(s), which may be used to hold cups, pens, etc.

In some embodiments, the frame assembly 530 may comprise application specific support rib structures 522 located on each of the composite elements 520, as well as other mounting features, support features, and threaded insert mounting bosses, which may be homogenously attached to at least a portion of the composite elements 520. For example, in FIG. 15 the frame assembly may further comprise perimeter/border support elements, internal support elements such as, for example, linking between the composite elements, and/or a snap-fit receptacle.

In some embodiments, each of the composite elements 520 may be attached to the frame assembly 530 at both ends 586 and 587 of the composite elements 520 and optionally at interior points such as, for example, via internal support elements which crosslink a plurality of composite elements to join them together. In some embodiments, the composite elements 520 may be attached to the frame assembly 530 along one or more of the sides 581, 582 and/or edges 583, 584 of the composite elements 520. In some embodiments, during injection molding, a portion of the frame assembly 530 may comprise a rib feature 522 along one or more of the sides/edges of the composite elements 520, wherein the rib feature 522 may be attached to a portion of the side/edge along the length of the composite element 520, and may in some embodiments extend to the edges 586 and 587 of the composite elements 520, such that the rib feature 522 is attached to the outer perimeter 532 of the frame assembly 530. In some embodiments, the tray table assembly 500 may further comprise a snap-fit receptacle 570 allowing removable attachment of a detachable snap-fit installed linear bearing support 560 (similar to the linear bearing support 460 described above). In some other embodiments, the linear bearing support 560 may be permanently attached to the tray table assembly 500.

As illustrated in FIG. 16, one or more of the composite elements 520 may comprise one or more apertures 524 provide through at least one wall section of the composite elements 520. For example, apertures typically might be located along the longitudinal centerline of each composite element. The aperture 524 may provide a pathway for the material of the thermoplastic frame assembly 530 to flow through and about the composite element(s) 520 during the injection molding process to create the frame assembly 530. The size, location, and number of the apertures 524 may be design specific and may be chosen based on conditions during the molding of the frame assembly 530 onto the composite elements 520, such as flow rates, flow temperatures, and flow lengths, to provide consistent and balanced flow during the molding and thereby meet the load requirements for a specific tray assembly 500. More specifically, the apertures may allow for injection molding material (e.g. thermoplastic) to flow through the components, thereby shortening the length of flow of the hot thermoplastic material used to create the ribs. Flow length can be important in formation of homogenous connective surfaces, since the resin should have significant thermal energy for such bonding. Thus, the apertures reduce flow length, and thereby, ensure more homogenous connection between the ribs (and/or other thermoplastic overmolding) and the composite elements. In a typical embodiment, the apertures are sized and located to ensure a consistent and balanced flow to create homogenous connective interfaces for meeting the load conditions of the tray.

In some embodiments, the rib assembly 522 may be formed about the apertures 524 through the composite element 520, wherein the rib feature 522 on one side 581 of the composite element 520 is homogenously attached to the rib feature 522 on the other side 582 of the composite element 520 via the apertures. The size of the ribs (as well as the number of composite elements and/or ribs) typically might depend on the specific load condition of the tray design. And in some embodiments, the thermoplastic frame assembly 530 (for example, the perimeter support elements) may attach homogenously to the composite elements 520 through the aperture(s) 524. In FIG. 15, for example, the rib elements and perimeter support elements of the frame assembly are linked/joined/attached/integral and attach to the elements (homogenously and mechanically interlocking with the apertures in the composite elements).

In some embodiments, the composite elements 520 may comprise thermally formed and consolidated thermoplastic encapsulated unidirectional or weave carbon or glass reinforcing fiber composite configured to meet the minimum load requirement of the tray table assembly 500. Additionally, the frame assembly 530 may comprise carbon or glass chopped fiber reinforced thermoplastic material, which may be injection molded and homogenously attached to the thermoplastic encapsulated unidirectional or weave carbon or glass reinforced composite element(s) 520 creating the thermoplastic composite frame assembly 530, wherein the thermoplastic material of the frame assembly 530 may be chemically compatible with the thermoplastic material of the composite element(s) 520 (to allow for homogenous or thermal attachment).

FIG. 17 illustrates a detailed view of the frame assembly 530 and composite elements 520. In some embodiments, the composite elements 520 may comprise one planar first surface 581 (or side), an opposing parallel second surface 582 (or side) of equal geometry, a third surface 583 (or edge) perpendicular and positioned between said first 581 and second 582 surfaces, and a fourth surface 584 (or edge) parallel and opposed to the third surface 583 having equal geometry of said third surface 583. The third and fourth surfaces typically have a width significantly smaller than that of the first and second surfaces. Said composite element 520 may be positioned in a vertical manner, with said third surface 583 parallel to the bottom of the tray table (not pictured for clarity) and the fourth surface 584 parallel to the top of the tray table (not pictured for clarity). For example, the composite may be oriented so that the centered array of fibers extends vertically from the third surface to the fourth surface, with the third and fourth surfaces respectfully forming the lower and upper surface support feature for defining the upper and lower surface of the tray, that is, for attachment to the cover sheets. As shown in FIG. 17, the composite elements 520 may be spaced apart along the frame assembly 530 forming a series of parallel composite elements 520, wherein the spacing may be uniform or different for each composite element 520. In some embodiments, each of the composite elements 520 may be at least partially encapsulated by the material of the frame assembly. In the embodiment shown in FIG. 17, the material of the frame assembly 530 may form the rib feature 522 on the first side 581 and second side 582 of the composite element 520, wherein the rib feature 522 may be homogenously attached to the composite element 520 and penetrate and interlock with the composite element 520 via the apertures 524 (shown in FIG. 16). Additionally, the composite element 520 may be attached to the frame assembly 530 at each distal end 586 and 587.

Embodiments of methods of formation (of a tray table assembly, for example) might include one or more of the following steps: forming multi-layered composite material (for example, by bonding two composite sheets); forming the composite material (either single or multi-layered, for example depending on the overall design requirements) into a corrugated composite structure (having an upper surface (typically formed by the peaks of the corrugations), a lower surface (typically formed by the valleys of the corrugations), and perimeter side edges); shaping the corrugated composite structure to the tray dimensions (for example, by cutting the corrugated composite material to dimensions based on the dimensions of the tray), forming a thermoplastic frame structure about the perimeter side edges of the corrugated composite structure; and/or bonding two cover sheets to the corrugated composite structure (for example, to the upper and lower surface of the corrugated composite structure respectively) and/or the thermoplastic frame structure to form upper and lower tray surfaces. Typically, the thermoplastic frame structure and the corrugated composite structure would comprise the same thermoplastic material, and the thermoplastic frame structure would be injection molded about the corrugated composite structure (forming homogeneous connections, for example chemical bonding or fusing). In some embodiments, the two cover sheets might be formed of the same thermoplastic material as the corrugated composite structure and/or the thermoplastic frame structure (for example, allowing ultrasonic welding to bond the elements together). In other embodiments, however, other bonding means, such as adhesive, might be employed. In some embodiments, the corrugated composite structure might be formed having a plurality of attachment assistance elements (such as a channel or an energy director). Typically, such attachment assistance elements would be located atop the peaks and/or at the bottom of the valleys of the corrugations. In embodiments having channel attachment assistance elements, adhesive would be placed in the channels. In embodiments having energy director attachment assistance elements, ultrasonic welding may be used to join/fuse the cover sheets to the corrugated composite structure. In some embodiments, the two cover sheets might comprise composite material, for example the same composite material as the corrugated composite structure. The thermoplastic frame structure of some embodiments may be configured or formed to accept at least one snap-fit installed linear bearing support component (which might be operable to be removed from the thermoplastic frame structure via extraction tool actuation of integral snap-fit members on the linear bearing support component).

In some alternative embodiments, forming single or multi-layered composite material may comprise layering thermoplastic film and reinforcing fiber cloth or weave, which would then be consolidated (for example via heat and/or compression) into a unitary composite material with reinforcing fibers located between two thermoplastic layers (as described above). So for example, each composite material layer might comprise two thermoplastic film layers sandwiching or surrounding a layer of reinforcing fiber (for example a weave of reinforcing fiber). Then, in some embodiments, forming the (single or multi-layered) composite material into a corrugated composite structure may comprise placing the one or more layers of composite on a press mold for the shape of the corrugated composite structure, with the press mold then being used (with heat, pressure, and optionally vacuum) to consolidate the one or more layers of composite (e.g. the one or more layer of reinforcing fibers with the two or more layers of thermoplastic (e.g. thermoplastic film)), thereby forming the corrugated composite structure.

Alternative methods of formation (of a tray table assembly) might also include one or more of the following steps: forming the composite material into a plurality of strips/support beams/struts with (vertical) width/height operable to space the cover sheets apart (e.g. depend on the thickness of the tray table), in which the central plane of reinforcing fibers extends vertically from a lower support surface/edge to an upper support surface/edge (and wherein the two support surfaces edges are substantially thinner than the vertical width/height of the composite material); arranging the plurality of composite elements within a mold configures to form a thermoplastic frame structure linking the plurality of composite elements together into a tray table assembly; forming a thermoplastic frame structure about the perimeter side edges of the corrugated composite structure; and/or bonding two cover sheets to the corrugated composite structure (for example, to the upper and lower surface of the corrugated composite structure respectively) and/or the thermoplastic frame structure to form upper and lower tray surfaces.

In some embodiments, forming the composite elements (plurality of strips/beams/struts) might comprise cutting a sheet of composite material into strips (e.g. width of strips equivalent of height of final composite elements and representing the distance between the two support surface edges) and/or trimming the length of the strings or sheet of composite to be sized to tray dimensions. The composite elements may also have apertures formed therein (for example, by drilling, cutting, milling, etc.). Once the composite elements are formed, they may be oriented vertically so that the central fiber reinforcement extends vertically. In some embodiments, forming the thermoplastic frame structure may include forming rib elements, with the rib elements longitudinally along the composite elements, with the rib penetrating the apertures in some embodiments (for example, with one rib element on each vertical side of a composite element and linked together via the apertures). The thermoplastic frame structure may also comprise at least a portion of the perimeter of the tray table in some embodiments.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A tray table comprising:
   a first cover;
   a second cover disposed opposite the first cover;
   a thermoplastic frame member disposed between the first cover and the second cover about a perimeter thereof;
   a composite support structure disposed between the first cover and the second cover, the composite support structure having a plurality of apertures formed therethrough to receive at least a portion of the thermoplastic frame member; and
   wherein at least one material present in the composite support structure is common with at least one of the thermoplastic frame member, the first cover, and the second cover thereby facilitating a chemically compatible homogenous joint therebetween.

2. The tray table of claim 1, wherein the composite support structure comprises alternating layers of thermoplastic resin and reinforcing fiber.

3. The tray table of claim 2, wherein a reinforcing fiber comprises at least one of carbon fiber fabric and glass fiber.

4. The tray table of claim 1, wherein the composite support structure comprises a waveform shape.

5. The tray table of claim 1 wherein the first cover, the second cover, the thermoplastic frame member, and the composite support structure form a tray table front assembly.

6. The tray table of claim 5, comprising:
   a tray rear assembly comprising:
   a third cover;
   a fourth cover disposed opposite the third cover;
   a second frame member disposed between the third cover and the fourth cover about a perimeter thereof;
   a second composite support structure disposed between the third cover and the fourth cover;
   wherein at least one material present in the second composite support structure is common with at least one of the second frame member, the third cover, and the fourth cover thereby facilitating a chemically compatible homogenous joint; and
   a hinge member disposed between the tray front assembly and the tray rear assembly.

7. The tray table of claim 1 comprising a linear bearing support structure received into a receptacle formed in the frame member.

8. The tray table of claim 7, wherein the linear support bearing comprises a snap-fit element having a projection that engages the receptacle formed in the frame member, the snap fit element facilitating selective removal of the linear support bearing.

9. The tray table of claim 8, comprising a biasing member that biases the snap-fit element outwardly of the linear support bearing so as to engage the receptacle.

10. The tray table of claim 9, comprising a plurality of composite support structures disposed between the first cover and the second cover and distributed across at least one of a length and a width thereof.

11. The tray table of claim 1, wherein the composite support structure comprises a plurality of apertures from along a length thereof.

12. The tray table of claim 11, wherein the plurality of apertures facilitate chemically compatible homogenous bonding with a thermoplastic resin injected therein.

13. A tray table comprising:
    a tray front assembly comprising:
    a first cover;
    a second cover disposed opposite the first cover;
    a thermoplastic frame member disposed between the first cover and the second cover about a perimeter thereof, the thermoplastic frame member having a receptacle formed therein;
    a composite support structure coupled to the thermoplastic frame member such that a chemically compatible homogenous joint is formed between the composite support and the thermoplastic frame member, the composite support structure having a plurality of apertures formed therethrough to receive at least a portion of the thermoplastic frame member; and
    a linear bearing support received in the receptacle.

14. The tray table of claim 13, wherein the composite support structure comprises alternating layers of thermoplastic resin and reinforcing fiber.

15. The tray table of claim 14, wherein a reinforcing fiber comprises at least one of carbon fiber fabric and glass fiber.

16. The tray table of claim 13, wherein the linear support bearing comprises a snap-fit element having a projection that engages the receptacle formed in the frame member, the snap-fit element facilitating selective removal of the linear bearing support from the receptacle.

17. The tray table of claim 16, comprising a biasing member that biases the snap-fit element outwardly of the linear support bearing so as to engage the receptacle.

18. The tray table of claim 13, wherein:
    the composite support structure comprises a plurality of apertures from along a length thereof; and
    the plurality of apertures facilitate chemically compatible homogenous bonding with a thermoplastic resin injected therein.

* * * * *